(12) United States Patent
Morabad

(10) Patent No.: US 11,762,572 B2
(45) Date of Patent: Sep. 19, 2023

(54) METHOD OF OPERATING STORAGE DEVICE AND METHOD OF OPERATING STORAGE SYSTEM USING THE SAME

(71) Applicant: SAMSUNG ELECTRONICS CO., LTD., Suwon-si (KR)

(72) Inventor: Gururaj Morabad, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 151 days.

(21) Appl. No.: 17/354,330

(22) Filed: Jun. 22, 2021

(65) Prior Publication Data
US 2022/0129181 A1    Apr. 28, 2022

(30) Foreign Application Priority Data
Oct. 26, 2020    (KR) .................. 10-2020-0139100

(51) Int. Cl.
G06F 3/06    (2006.01)

(52) U.S. Cl.
CPC .......... *G06F 3/0647* (2013.01); *G06F 3/0604* (2013.01); *G06F 3/065* (2013.01); *G06F 3/0656* (2013.01); *G06F 3/0683* (2013.01)

(58) Field of Classification Search
CPC ...... G06F 3/0647; G06F 3/0604; G06F 3/065; G06F 3/0656; G06F 3/0683
See application file for complete search history.

(56) References Cited

U.S. PATENT DOCUMENTS

| 9,430,268 | B2 | 8/2016 | Hussain et al. |
| 9,792,172 | B2 | 10/2017 | Kanno |
| 10,154,112 | B1 | 12/2018 | Anthony et al. |
| 10,592,162 | B2 | 3/2020 | Peterson et al. |
| 10,642,505 | B1 | 5/2020 | Kuzmin et al. |
| 10,713,203 | B2 | 7/2020 | Bai et al. |

(Continued)

FOREIGN PATENT DOCUMENTS

| CN | 111143279 A | 5/2020 | |
| EP | 3121718 * | 2/1964 | ............. G06F 11/10 |
| EP | 3 663 928 A1 | 6/2020 | |

OTHER PUBLICATIONS

Communication dated Feb. 15, 2022, issued by the European Patent Office in counterpart European Application No. 21191500.4.

*Primary Examiner* — Eric Cardwell
(74) *Attorney, Agent, or Firm* — Sughrue Mion, PLLC

(57) ABSTRACT

In a method of operating storage devices including a first storage device and a second storage device connected to each other via a host device, a data migration request for a first namespace included in the first storage device is received. A second namespace is generated in the second storage device. The second namespace corresponds to the first namespace. A pointer table that is used to perform a data migration operation corresponding to the data migration request is set. First data and second data are migrated to the second namespace based on the pointer table. The first data is stored in the first namespace. The second data is stored in a first buffer memory included in the first storage device and corresponds to the first namespace. Based on the data migration operation being performed, the second data is directly transmitted from the first buffer memory to the second namespace.

20 Claims, 20 Drawing Sheets

(56) References Cited

U.S. PATENT DOCUMENTS

| | | | | |
|---|---|---|---|---|
| 2014/0181400 A1* | 6/2014 | Lin | ....................... | G06F 3/0608 |
| | | | | 711/114 |
| 2020/0218668 A1 | 7/2020 | Han et al. | | |
| 2020/0233601 A1 | 7/2020 | Du et al. | | |
| 2020/0326871 A1* | 10/2020 | Wu | ....................... | G06F 3/0647 |
| 2022/0113885 A1* | 4/2022 | Jeon | ....................... | G06F 3/0631 |

* cited by examiner

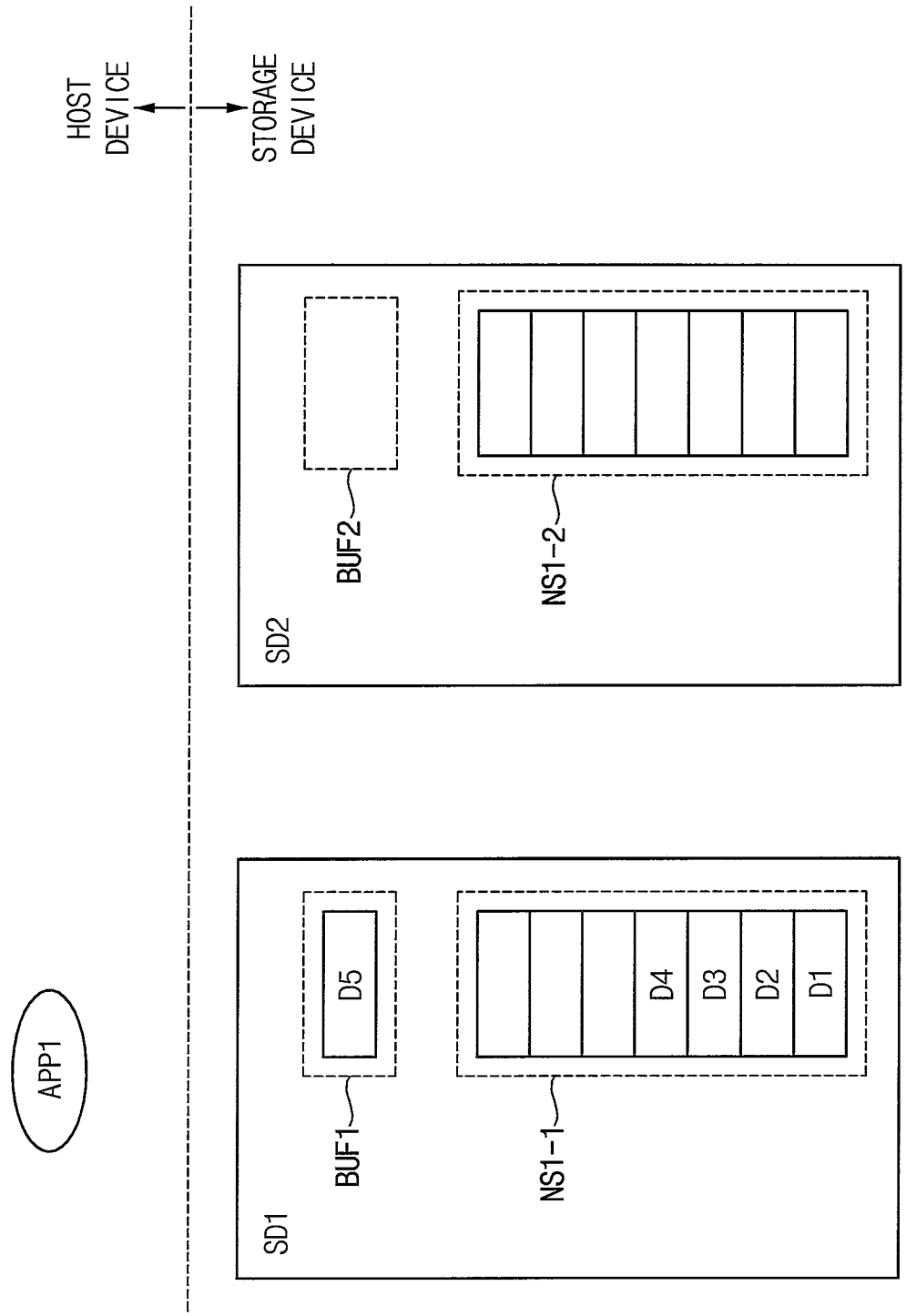

FIG. 9B

| ORIGINAL NAMESPACE (NS1-1) || TARGET NAMESPACE (NS1-2) ||
|---|---|---|---|
| POINTER | LOGICAL ADDRESS | TARGET POINTER | LOGICAL ADDRESS |
| P3 | LBA3-1 | TP3 | LBA3-2 |
| P2 | LBA2-1 | TP2 | LBA2-2 |
| P1 | LBA1-1 | TP1 | LBA1-2 |

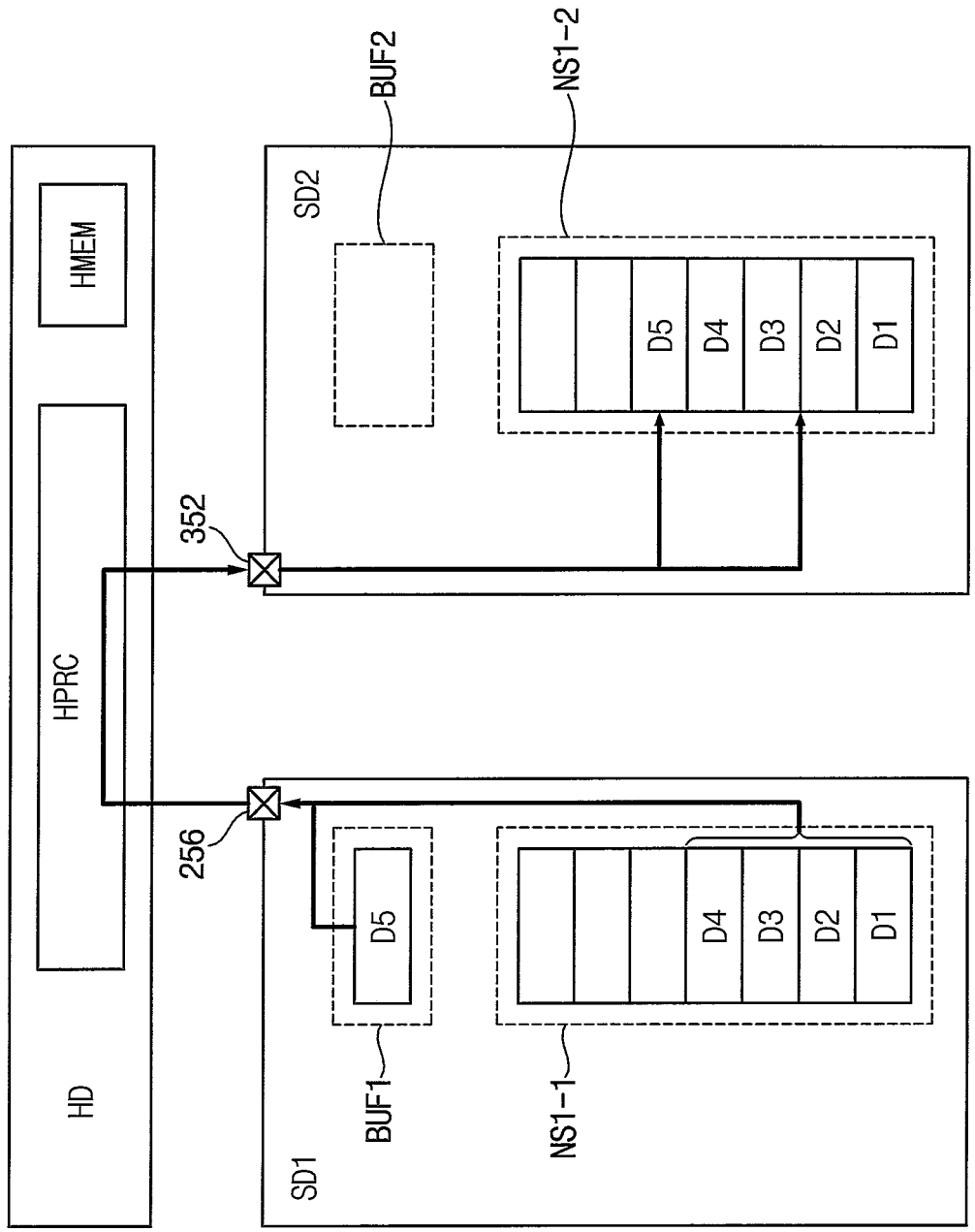

METHOD OF OPERATING STORAGE DEVICE AND METHOD OF OPERATING STORAGE SYSTEM USING THE SAME

CROSS-REFERENCE TO THE RELATED APPLICATION(S)

This application claims priority under 35 USC § 119 to Korean Patent Application No. 10-2020-0139100 filed on Oct. 26, 2020 in the Korean Intellectual Property Office (KIPO), the contents of which are herein incorporated by reference in their entireties.

BACKGROUND

1. Technical Field

Example embodiments relate generally to semiconductor integrated circuits, and more particularly to methods of operating storage devices, and methods of operating storage systems using the methods of operating the storage devices.

2. Description of the Related Art

Certain types of data storage devices include one or more semiconductor memory devices. Examples of such data storage devices include solid state drives (SSDs). These types of data storage devices may have various design and/or performance advantages over hard disk drives (HDDs). Examples of potential advantages include the absence of moving mechanical parts, higher data access speeds, stability, durability, and/or low power consumption. Recently, various systems, e.g., a laptop computer, a car, an airplane, a drone, etc., have adopted the SSDs for data storage.

Recently, some data storage devices that include semiconductor memory devices support a namespace function. For example, to support operations of a host device, a data storage device implemented with one physical device may be partitioned into a plurality of logical devices (e.g., namespaces). The host device may then manage data based on the namespaces.

SUMMARY

At least one example embodiment of the disclosure provides a method of operating storage devices supporting a namespace function and capable of efficiently performing a data migration operation.

At least one example embodiment of the disclosure provides a method of operating a storage system using the method of operating the storage devices.

According to example embodiments, in a method of operating storage devices including a first storage device and a second storage device that are connected to each other via a host device, a data migration request for a first namespace included in the first storage device is received. A second namespace is generated in the second storage device. The second namespace corresponds to the first namespace. A pointer table that is used to perform a data migration operation corresponding to the data migration request is set. First data and second data are migrated to the second namespace based on the pointer table. The first data is stored in the first namespace. The second data is stored in a first buffer memory included in the first storage device and corresponds to the first namespace. Based on the data migration operation being performed, the second data is directly transmitted from the first buffer memory to the second namespace.

According to example embodiments, in a method of operating a storage system including a host device, a first storage device and a second storage device, the first and second storage devices are connected to each other via the host device. While the host device accesses a first namespace included in the first storage device, a data migration operation is performed on the first namespace. After the data migration operation is completed, a second namespace included in the second storage device is accessed by the host device. Based on performing the data migration operation, a data migration request for the first namespace is generated. The second namespace is generated in the second storage device. The second namespace corresponds to the first namespace. A pointer table that is used to perform the data migration operation is set. First data and second data are migrated to the second namespace based on the pointer table. The first data is stored in the first namespace. The second data is stored in a first buffer memory included in the first storage device and corresponds to the first namespace. Based on the data migration operation being performed, the second data is directly transmitted from the first buffer memory to the second namespace.

According to example embodiments, in a method of operating storage devices including a first storage device and a second storage device that are connected to each other via a host device, while an application or a virtual machine executed by the host device accesses a first namespace included in the first storage device, a data migration request for the first namespace is received from the host device. A second namespace is generated in the second storage device based on the data migration request. The second namespace corresponds to the first namespace and has a capacity greater than or equal to that of the first namespace. A pointer table that is used to perform a data migration operation is set based on the data migration request. First data and second data are migrated to the second namespace based on the pointer table. The first data is stored in the first namespace. The second data is stored in a first buffer memory included in the first storage device and corresponds to the first namespace. In setting the pointer table, a first pointer, a second pointer and a third pointer are set in the first namespace. The first, second and third pointers indicate locations of the first and second data that are continuously stored in the first namespace. A first target pointer, a second target pointer and a third target pointer are set in the second namespace. The first, second and third target pointers indicate locations of the first and second data that are continuously stored in the second namespace. Based on the data migration operation being performed, the first data is copied to the second namespace such that the first data corresponds to the first and second target pointers, and the second data is copied to the second namespace such that the second data corresponds to the second and third target pointers. Based on the data migration operation being performed, the second data is not flushed from the first buffer memory to the first namespace and is directly transmitted from the first buffer memory to the second namespace without passing through the first namespace.

BRIEF DESCRIPTION OF THE DRAWINGS

Illustrative, non-limiting example embodiments will be more clearly understood from the following detailed description taken in conjunction with the accompanying drawings.

FIGS. 7A, 7B and 7C are diagrams for describing an example of receiving a data migration request and an example of generating a second namespace in FIG. 1.

FIGS. 9A and 9B are diagrams for describing an operation of setting a pointer table of FIG. 8.

FIGS. 12A and 12B are diagrams for describing examples of migrating first data and second data to a second namespace of FIG. 10.

DETAILED DESCRIPTION

Figure 1:
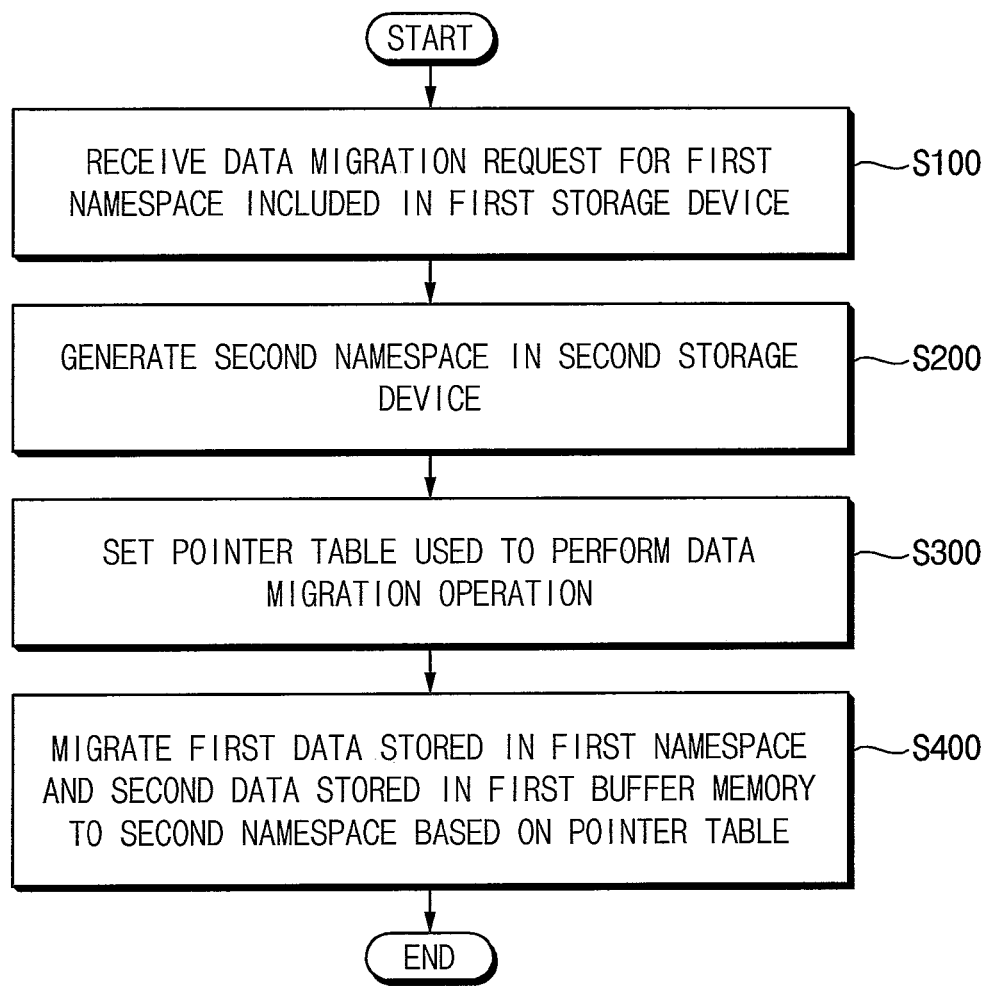
FIG. 1 is a flowchart illustrating a method of operating storage devices according to example embodiments.

Various example embodiments will be described more fully with reference to the accompanying drawings, in which embodiments are shown. The disclosure may, however, be embodied in many different forms and should not be construed as limited to the embodiments set forth herein. Like reference numerals refer to like elements throughout this application.

FIG. 1 is a flowchart illustrating a method of operating storage devices according to example embodiments.

Referring to FIG. 1, a method of operating storage devices according to example embodiments may be performed by a first storage device and a second storage device that are connected to each other via a host device. Each of the first and second storage devices may include a storage controller, a plurality of nonvolatile memories and a buffer memory (or a cache memory). Detailed configurations of the storage devices and a storage system including the storage devices will be described with reference to FIG. 2.

In the method of operating the storage devices according to example embodiments, a data migration request for a first namespace included in the first storage device is received (S100). For example, the data migration request may be provided from the host device to the first and second storage devices. For example, the data migration request may be provided in real time and/or online (or during runtime) while the first storage device is accessed (e.g., while the host device accesses the first storage device).

One namespace may represent one logical partition and/or storage space. Typically, one storage device with a relatively high storage capacity may be divided into a plurality of namespaces, and all of the plurality of namespaces may be physically included in the same storage device. Each namespace may be used as a separate and/or individual storage space. For example, the first storage device may further include at least one namespace other than the first namespace.

Based on the data migration request, a second namespace corresponding to the first namespace is generated or created in the second storage device (S200). In other words, the data migration request may be a request for a data migration operation in which the first namespace included in the first storage device is moved or copied to the second namespace included in the second storage device. The first namespace may be referred to as an original namespace or a source namespace, and the second namespace may be referred to as a target namespace or a destination namespace.

A pointer table that is used to perform the data migration operation corresponding to the data migration request is set (S300). For example, the pointer table may include pointers (e.g., original or source pointers) corresponding to the first namespace and target pointers (or destination pointers) corresponding to the second namespace. Operation S300 will be described in detail with reference to FIG. 8.

First data and second data are migrated to the second namespace based on the pointer table (S400). The first data is stored in the first namespace. The second data is stored in a first buffer memory included in the first storage device, and corresponds to the first namespace. Operation S400 will be described in detail with reference to FIG. 10.

In some example embodiments, the first data and the second data may be migrated to the second namespace at a time (or at once). In other words, the first and second data may be migrated to the second namespace based on the one data migration request received in S100 without any additional request.

In some example embodiments, the first data may be cold data that is already stored in the first namespace, and the second data may be hot data that is to be flushed from the first buffer memory to the first namespace. Hereinafter, the hot data and the cold data are not distinguished or differentiated depending on the frequency of data accesses and/or the number of data updates. Instead, the hot data and the cold data may be distinguished depending on locations in which data is stored. For example, data that are provided from the host device and correspond to the first namespace may be stored in the first namespace via the first buffer memory. Among the data to be stored in the first namespace, data that has already been flushed from the first buffer memory to the first namespace may be defined as the cold data, and data that has not yet been flushed to the first namespace and remain in the first buffer memory may be defined as the hot data.

In some example embodiments, when the data migration operation is performed, the second data may be directly transmitted or transferred from the first buffer memory to the second namespace. For example, when the data migration operation is performed, the second data may not be flushed from the first buffer memory to the first namespace, and may be directly transmitted from the first buffer memory to the second namespace without passing through the first namespace.

In some example embodiments, as described above, the first and second storage devices may not be directly connected to each other, and may be connected to each other via the host device. Therefore, an operation in which the second data is directly transmitted from the first buffer memory to the second namespace may represent that the second data is transmitted from the first buffer memory to the second namespace via the host device without passing through a host memory included in the host device, rather than that the second data is directly transmitted from the first buffer memory to the second namespace without passing through any other components.

In some example embodiments, the first and second storage devices may operate based on a nonvolatile memory express (NVMe) protocol. The NVMe may be an interface of a register level that performs a communication between a storage device such as a solid state drive (SSD) and host software. The NVMe may be based on an existing peripheral component interconnect express (PCIe) bus and may be an interface designed or, alternatively, optimized for a SSD. The NVMe drives may be accessed using namespaces.

In the method of operating the storage devices according to example embodiments, the first data stored in the first namespace and the second data stored in the first buffer memory included in the first storage device may be migrated to the second namespace at a time when performing the data migration operation in which the first namespace included in the first storage device is moved to the second namespace included in the second storage device. In addition, the second data may be directly transmitted from the first buffer memory to the second namespace without passing through the host memory included in the host device. Accordingly, the online and/or real time namespace data migration process may be efficiently implemented while the data integrity is maintained, and the time and space for data processing may be saved.

Figure 2:
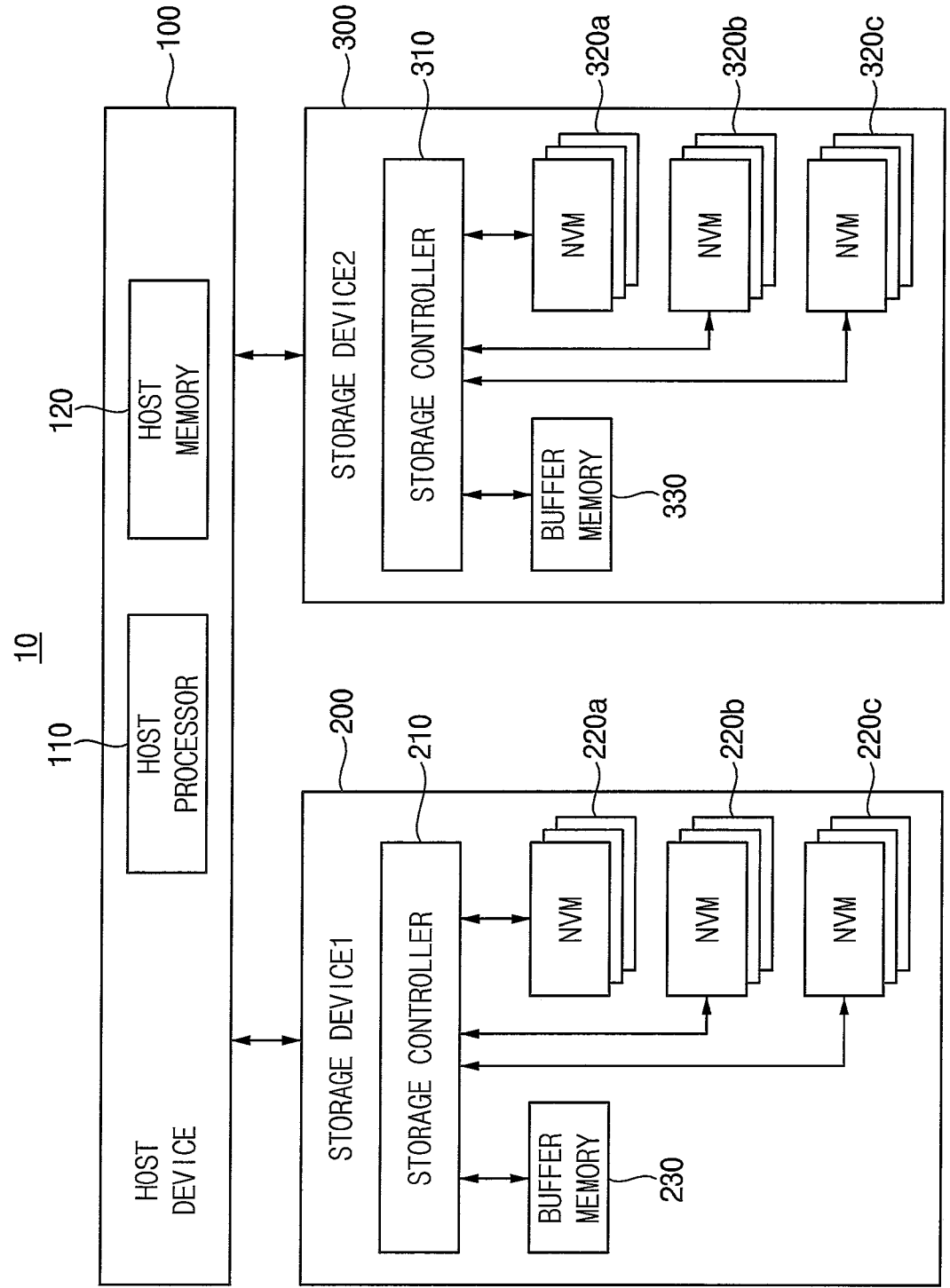
FIG. 2 is a block diagram illustrating a storage device and a storage system including a storage device according to example embodiments.

FIG. 2 is a block diagram illustrating a storage device and a storage system including the storage device according to example embodiments.

Referring to FIG. 2, a storage system 10 includes a host device 100, a first storage device 200 and a second storage device 300.

The host device 100 controls overall operations of the storage system 10. For example, the host device 100 may include a host processor 110 and a host memory 120. The host processor 110 may control an operation of the host device 100. For example, the host processor 110 may execute an operating system (OS). The host memory 120 may store instructions and/or data that are executed and/or processed by the host processor 110. For example, the operating system executed by the host processor 110 may include a file system for file management and a device driver for controlling peripheral devices including the storage devices 200 and 300 at the operating system level.

In some example embodiments, as will be described with reference to FIGS. 6A and 6B, the host device 100 may execute a plurality of applications and/or a plurality of virtual machines that are different from each other and are driven or run on the operating system.

Each of the first and second storage devices 200 and 300 is accessed by the host device 100. The first storage device 200 may include a first storage controller 210, a plurality of first nonvolatile memories 220a, 220b and 220c, and a first buffer memory 230. The second storage device 300 may include a second storage controller 310, a plurality of second nonvolatile memories 320a, 320b and 320c, and a second buffer memory 330.

The first storage controller 210 may control an operation of the first storage device 200 and/or operations of the plurality of first nonvolatile memories 220a, 220b and 220c based on a command, an address and data that are received from the host device 100.

The plurality of first nonvolatile memories 220a, 220b and 220c may store a plurality of data. For example, the plurality of first nonvolatile memories 220a, 220b and 220c may store meta data, various user data, or the like.

In some example embodiments, each of the plurality of first nonvolatile memories 220a, 220b and 220c may include a NAND flash memory. In other example embodiments, each of the plurality of first nonvolatile memories 220a, 220b and 220c may include one of an electrically erasable programmable read only memory (EEPROM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), or the like.

In some example embodiments, a plurality of namespaces may be set on the plurality of first nonvolatile memories 220a, 220b and 220c. For example, as will be described with reference to FIGS. 5A and 5B, one namespace may be set on at least a portion or part of the plurality of first nonvolatile memories 220a, 220b and 220c.

The first buffer memory 230 may store instructions and/or data that are executed and/or processed by the first storage controller 210, and may temporarily store data stored in or to be stored into the plurality of first nonvolatile memories 220a, 220b and 220c. For example, the first buffer memory 230 may include at least one of various volatile memories, e.g., a dynamic random access memory (DRAM), a static random access memory (SRAM), or the like.

The second storage controller 310 may control an operation of the second storage device 300 and/or operations of the plurality of second nonvolatile memories 320a, 320b and 320c. The plurality of second nonvolatile memories 320a, 320b and 320c may store a plurality of data. The second buffer memory 330 may store instructions and/or data that are executed and/or processed by the second storage controller 310, and may temporarily store data stored in or to be stored into the plurality of second nonvolatile memories 320a, 320b and 320c. The second storage controller 310, the plurality of second nonvolatile memories 320a, 320b and 320c, and the second buffer memory 330 may be substantially the same as the first storage controller 210, the plurality of first nonvolatile memories 220a, 220b and 220c, and the first buffer memory 230, respectively.

The first and second storage devices 200 and 300 may perform the method described with reference to FIG. 1. For example, the first and second storage devices 200 and 300 may receive a data migration request from the host device 100, a second namespace corresponding to a first namespace in the first storage device 200 may be generated in the second storage device 300, a pointer table that is used to perform a data migration operation may be set, and data in the first namespace and the first buffer memory 230 may be migrated to the second namespace at a time based on the pointer table. In other words, the online and/or real time namespace data migration process may be performed. In addition, the first and second storage devices 200 and 300 may perform a method of operating storage devices which will be described with reference to FIG. 13, and the host device 100 and the first and second storage devices 200 and 300 may perform a method of operating a storage system which will be described with reference to FIG. 14.

In some example embodiments, each of the first and second storage devices 200 and 300 may be a solid state drive (SSD). In other example embodiments, each of the first and second storage devices 200 and 300 may be a universal flash storage (UFS), a multi media card (MMC) or an embedded multi media card (eMMC). In still other example embodiments, each of the first and second storage devices 200 and 300 may be one of a secure digital (SD) card, a micro SD card, a memory stick, a chip card, a universal serial bus (USB) card, a smart card, a compact flash (CF) card, or the like.

In some example embodiments, each of the first and second storage devices 200 and 300 may be connected to the host device 100 through a block accessible interface which may include, for example, a UFS, an eMMC, a serial advanced technology attachment (SATA) bus, a nonvolatile memory express (NVMe) bus, a serial attached SCSI (SAS) bus, or the like. Each of the storage devices 200 and 300 may use a block accessible address space corresponding to an access size of the plurality of nonvolatile memories 220a, 220b, 220c, 320a, 320b and 320c to provide the block accessible interface to the host device 100, for allowing the access by units of a memory block with respect to data stored in the plurality of nonvolatile memories 220a, 220b, 220c, 320a, 320b and 320c.

In some example embodiments, the storage system 10 may be any computing system, such as a personal computer (PC), a server computer, a data center, a workstation, a digital television, a set-top box, a navigation system, or the like. In other example embodiments, the storage system 10 may be any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, or the like.

Figure 3:
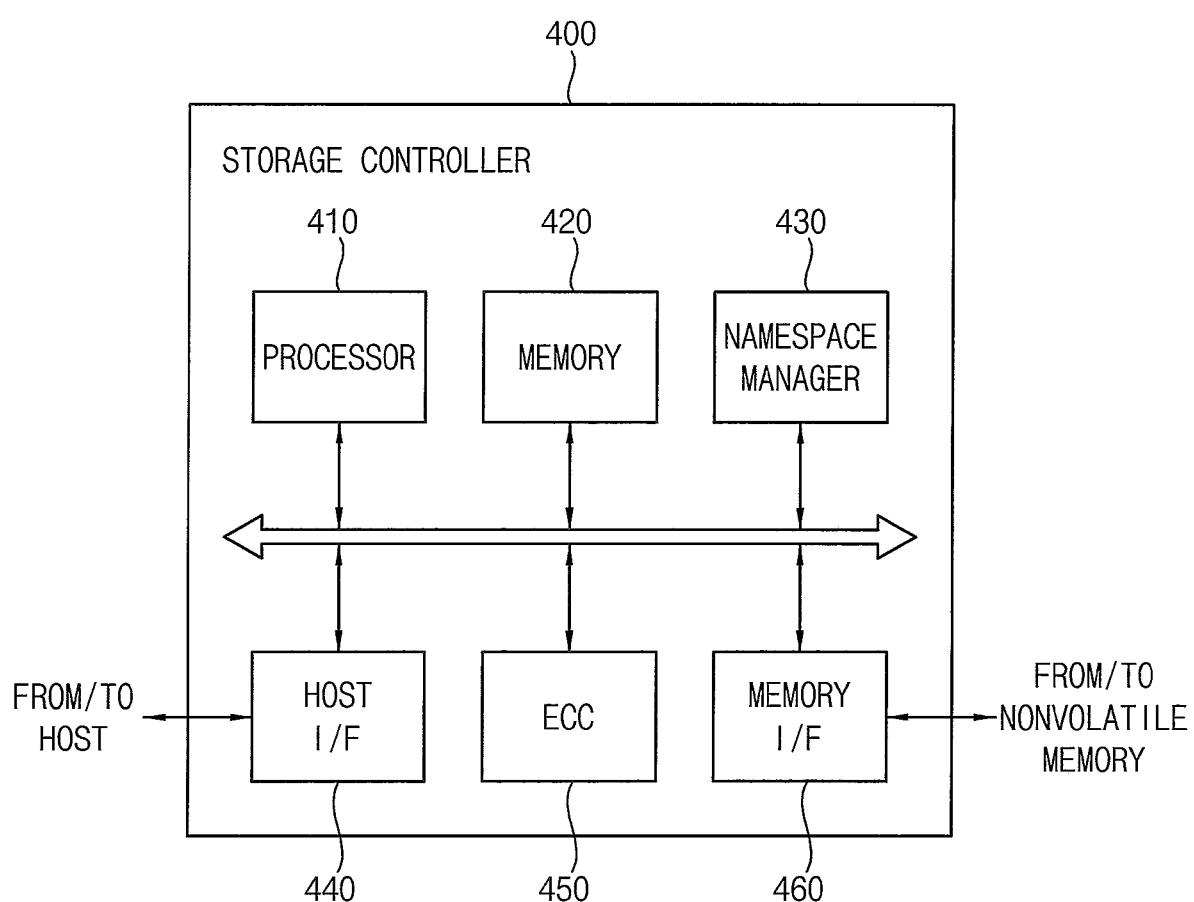
FIG. 3 is a block diagram illustrating an example of a storage controller included in a storage device according to example embodiments.

FIG. 3 is a block diagram illustrating an example of a storage controller included in a storage device according to example embodiments.

Referring to FIG. 3, a storage controller 400 includes at least one processor 410, a memory 420, a namespace manager 430, a host interface 440, an error correction code (ECC) block 450 and a memory interface 460. For example, the storage controller 400 may be the first storage controller 210 or the second storage controller 310 in FIG. 2.

The processor 410 may control an operation of the storage controller 400 in response to a command received via the host interface 440 from a host device (e.g., the host device 100 in FIG. 2). In some example embodiments, the processor 410 may control respective components by employing firmware for operating a storage device (e.g., the first storage device 200 in FIG. 2).

The memory 420 may store instructions and data executed and processed by the processor 410. For example, the memory 420 may be implemented with a volatile memory with relatively small capacity and high speed, such as a static random access memory (SRAM), a cache memory, or the like.

The namespace manager 430 may generate, set, and manage namespaces on nonvolatile memories (e.g., the first nonvolatile memories 220a, 220b and 220c in FIG. 2) included in the storage device. In some example embodiments, at least a part of the namespace manager 430 may be implemented as hardware. For example, at least a part of the namespace manager 430 may be included in a computer-based electronic system. In other example embodiments, at least a part of the namespace manager 430 may be implemented as instruction codes or program routines (e.g., a software program). For example, the instruction codes or the program routines may be executed by a computer-based electronic system, and may be stored in any storage device located inside or outside the computer-based electronic system.

The ECC block 450 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 440 may provide physical connections between the host device and the storage device. The host interface 440 may provide an interface corresponding to a bus format of the host for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), or the like, format.

The memory interface 460 may exchange data with the nonvolatile memories. The memory interface 460 may transfer data to the nonvolatile memories, or may receive data read from the nonvolatile memories. In some example embodiments, the memory interface 460 may be connected to the nonvolatile memories via one channel. In other example embodiments, the memory interface 460 may be connected to the nonvolatile memories via two or more channels.

Figure 4:
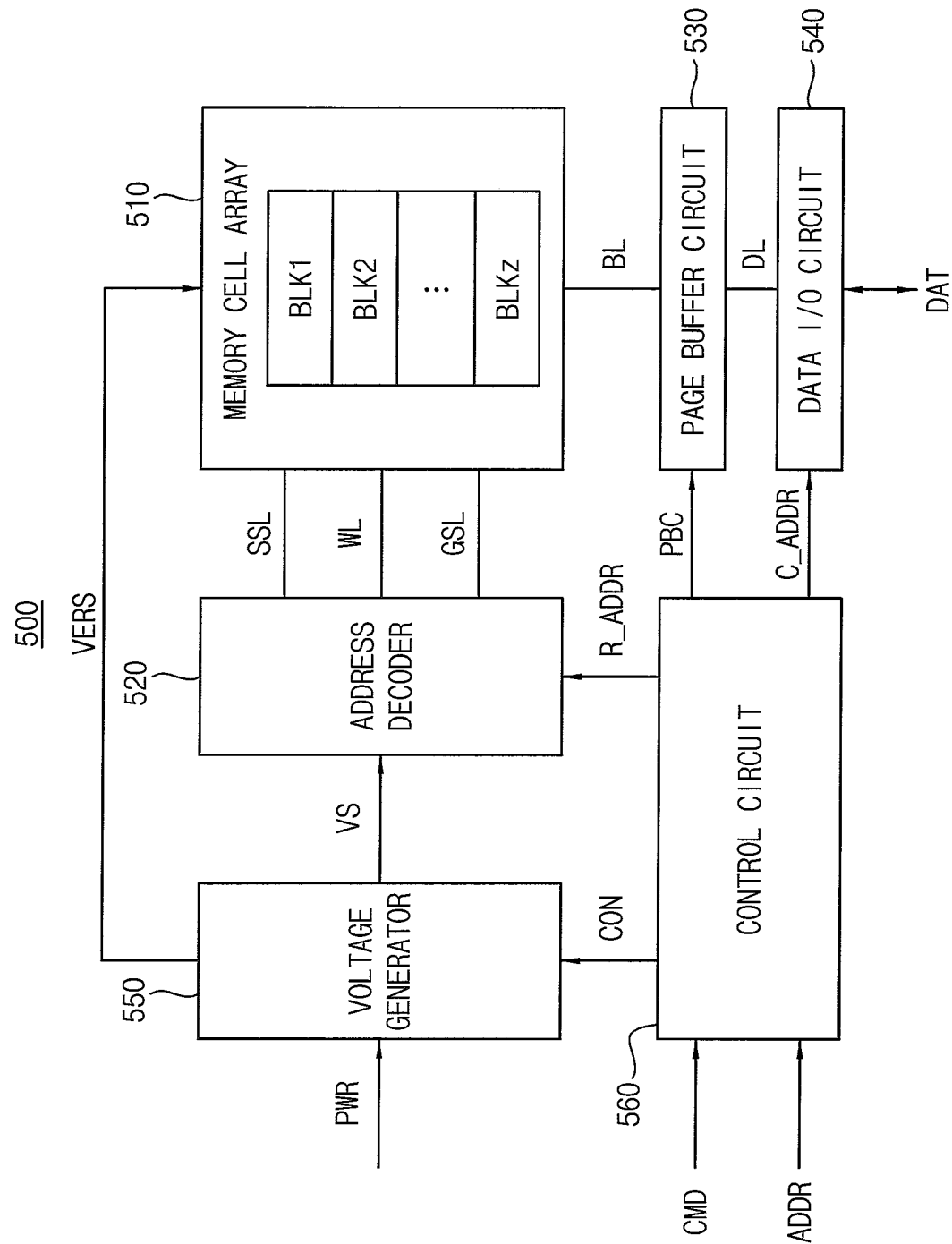
FIG. 4 is a block diagram illustrating an example of a nonvolatile memory included in a storage device according to example embodiments.

FIG. 4 is a block diagram illustrating an example of a nonvolatile memory included in a storage device according to example embodiments.

Referring to FIG. 4, a nonvolatile memory 500 includes a memory cell array 510, an address decoder 520, a page buffer circuit 530, a data input/output (I/O) circuit 540, a voltage generator 550 and a control circuit 560. For example, the nonvolatile memory 500 may be one of the first nonvolatile memories 220a, 220b and 220c or one of the plurality of second nonvolatile memories 320a, 320b and 320c in FIG. 2.

The memory cell array 510 is connected to the address decoder 520 via a plurality of string selection lines SSL, a plurality of wordlines WL and a plurality of ground selection lines GSL. The memory cell array 510 is further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1, BLK2, . . . , BLKz, each of which includes memory cells. In addition, each of the plurality of memory blocks BLK1, BLK2, . . . , BLKz may be divided into a plurality of pages.

In some example embodiments, the plurality of memory cells may be arranged in a two-dimensional (2D) array structure or a three-dimensional (3D) vertical array structure. A three-dimensional vertical array structure may include vertical cell strings that are vertically oriented such that at least one memory cell is located over another memory cell. The at least one memory cell may comprise a charge trap layer. The following patent documents, which are hereby incorporated by reference in their entireties, describe suitable configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Application Pub. No. 2011/0233648.

The control circuit 560 receives a command CMD and an address ADDR from the outside (e.g., the host device 100 and/or the first storage controller 210 in FIG. 2), and control erasure, programming and read operations of the nonvolatile memory 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recover read operation.

For example, the control circuit 560 may generate control signals CON, which are used for controlling the voltage generator 550, and may generate control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL.

For example, in the data erase/write/read operations, the address decoder 520 may determine, based on the row address R_ADDR, at least one of the plurality of wordlines WL as a selected wordline, and may determine the rest or remainder of the plurality of wordlines WL other than the selected wordline as unselected wordlines.

In addition, in the data erase/write/read operations, the address decoder 520 may determine, based on the row address R_ADDR, at least one of the plurality of string selection lines SSL as a selected string selection line, and may determine the rest or remainder of the plurality of string selection lines SSL other than the selected string selection line as unselected string selection lines.

Further, in the data erase/write/read operations, the address decoder 520 may determine, based on the row address R_ADDR, at least one of the plurality of ground selection lines GSL as a selected ground selection line, and may determine the rest or remainder of the plurality of ground selection lines GSL other than the selected ground selection line as unselected ground selection lines.

The voltage generator 550 may generate voltages VS that are required for an operation of the nonvolatile memory 500, based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation, based on the power PWR and the control signals CON. The erase voltage VERS may be applied to the memory cell array 510 directly or via the bitline BL.

For example, during the erase operation, the voltage generator 550 may apply the erase voltage VERS to a common source line and/or the bitline BL of a memory block (e.g., a selected memory block) and may apply an erase permission voltage (e.g., a ground voltage) to all wordlines of the memory block or a portion of the wordlines via the address decoder 520. In addition, during the erase verification operation, the voltage generator 550 may apply an erase verification voltage simultaneously to all wordlines of the memory block or sequentially to the wordlines one by one.

For example, during the program operation, the voltage generator 550 may apply a program voltage to the selected wordline and may apply a program pass voltage to the unselected wordlines via the address decoder 520. In addition, during the program verification operation, the voltage generator 550 may apply a program verification voltage to the selected wordline and may apply a verification pass voltage to the unselected wordlines via the address decoder 520.

In addition, during the normal read operation, the voltage generator 550 may apply a read voltage to the selected wordline and may apply a read pass voltage to the unselected wordlines via the address decoder 520. During the data recover read operation, the voltage generator 550 may apply the read voltage to a wordline adjacent to the selected wordline and may apply a recover read voltage to the selected wordline via the address decoder 520.

The page buffer circuit 530 may be connected to the memory cell array 510 via the plurality of bitlines BL. The page buffer circuit 530 may include a plurality of page buffers. In some example embodiments, each page buffer may be connected to one bitline. In other example embodiments, each page buffer may be connected to two or more bitlines.

The page buffer circuit 530 may store data DAT to be programmed into the memory cell array 510 or may read data DAT sensed from the memory cell array 510. In other words, the page buffer circuit 530 may operate as a write driver or a sensing amplifier according to an operation mode of the nonvolatile memory 500.

The data I/O circuit 540 may be connected to the page buffer circuit 530 via data lines DL. The data I/O circuit 540 may provide the data DAT from an outside of the nonvolatile memory 500 to the memory cell array 510 via the page buffer circuit 530 or may provide the data DAT from the memory cell array 510 to the outside of the nonvolatile memory 500, based on the column address C_ADDR.

FIGS. 5A, 5B, 6A and 6B are diagrams for describing operations of generating, setting and managing namespaces in a storage device according to example embodiments.

Figure 5A:
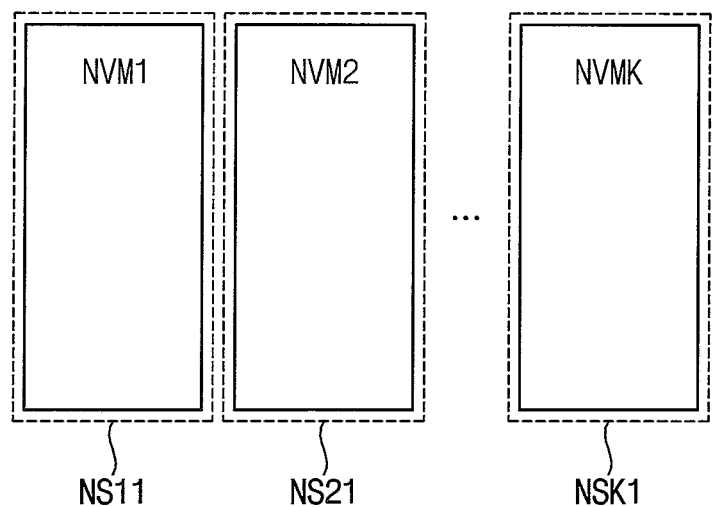
FIGS. 5A, 5B, 6A and 6B are diagrams for describing operations of generating, setting and managing namespaces in a storage device according to example embodiments.

Referring to FIG. 5A, an example of generating and setting a plurality of namespaces NS11, NS21, . . . , NSK1 on a plurality of nonvolatile memories NVM1, NVM2, . . . , NVMK is illustrated, where K is a natural number greater than or equal to two. For example, the plurality of nonvolatile memories NVM1, NVM2, . . . , NVMK may be included in one storage device, and thus the plurality of namespaces NS11, NS21, . . . , NSK1 may also be included in one storage device.

In an example of FIG. 5A, one namespace may be generated and set on one nonvolatile memory. For example, the namespace NS11 may be generated and set on the entire region of the nonvolatile memory NVM1, the namespace NS21 may be generated and set on the entire region of the nonvolatile memory NVM2, and the namespace NSK1 may be generated and set on the entire region of the nonvolatile memory NVMK.

In some example embodiments, the plurality of namespaces NS11, NS21, ..., NSK1 may have the same capacity or different capacities. Although FIG. 5A illustrates that the number of namespaces NS11, NS21, ..., NSK1 is equal to the number of nonvolatile memories NVM1, NVM2, ..., NVMK, example embodiments are not limited thereto, and the number of namespaces and the number of nonvolatile memories may be changed according to example embodiments.

Figure 5B:
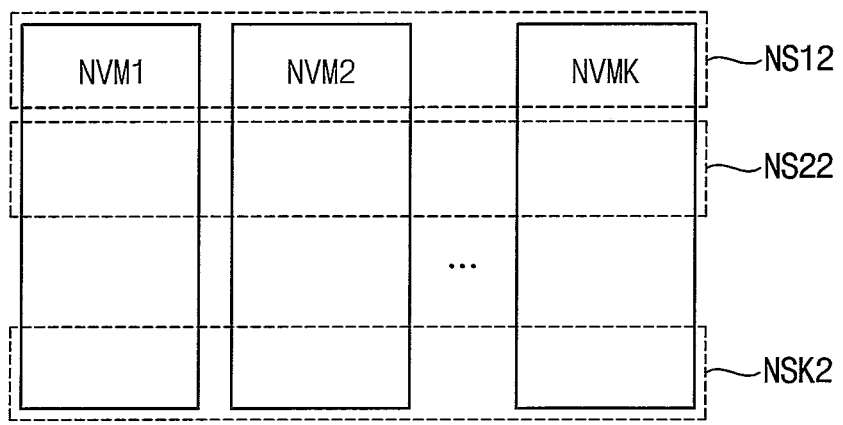

Referring to FIG. 5B, another example of generating and setting a plurality of namespaces NS12, NS22, ..., NSK2 on a plurality of nonvolatile memories NVM1, NVM2, ..., NVMK is illustrated. The repetitive descriptions in view of FIG. 5A will be omitted.

In an example of FIG. 5B, one namespace may be generated and set on all of the plurality of nonvolatile memories NVM1, NVM2, ..., NVMK. For example, the namespace NS12 may be generated and set on some regions of all of the plurality of nonvolatile memories NVM1, NVM2, ..., NVMK, the namespace NS22 may be generated and set on some other regions of all of the plurality of nonvolatile memories NVM1, NVM2, ..., NVMK, and the namespace NSK2 may be generated and set on some other regions of all of the plurality of nonvolatile memories NVM1, NVM2, ..., NVMK.

Although not illustrated in FIGS. 5A and 5B, the operation of generating and setting the namespace may be changed according to example embodiments. For example, one namespace may be generated and set on the entire regions or partial regions of some nonvolatile memories (e.g., the nonvolatile memories NVM1 and NVM2).

Figure 6A:
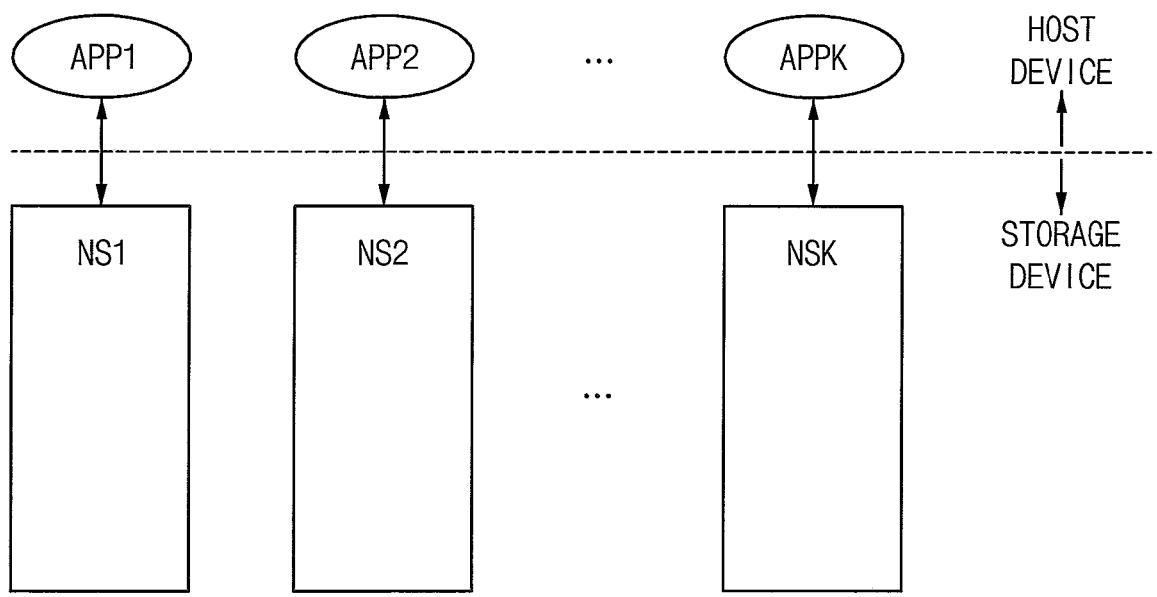

Referring to FIG. 6A, an example or allocating or assigning a plurality of namespaces NS1, NS2, ..., NSK is illustrated. For example, the plurality of namespaces NS1, NS2, ..., NSK may be included in one storage device.

In an example of FIG. 6A, each of a plurality of applications APP1, APP2, ..., APPK may be allocated to a respective one of the plurality of namespaces NS1, NS2, ..., NSK depending on the types and characteristics of the plurality of applications APP1, APP2, ..., APPK that are executed or run on a host device (e.g., the host device 100 in FIG. 2). For example, the namespace NS1 may be allocated to the application APP1, the namespace NS2 may be allocated to the application APP2, and the namespace NSK may be allocated to the application APPK.

In some example embodiments, each of the plurality of applications APP1, APP2, ..., APPK may be referred to as an application program, and may be an application software program that is executed on an operating system. For example, each of the plurality of applications APP1, APP2, ..., APPK may be programmed to aid in generating, copying and deleting a file. For example, each of the plurality of applications APP1, APP2, ..., APPK may provide various services such as a video application, a game application, a web browser application, etc. Each of the plurality of applications APP1, APP2, ..., APPK may generate tasks, jobs and/or requests for using or accessing a respective one of the plurality of namespaces NS1, NS2, ..., NSK (e.g., for performing data write/read/erase operations on a respective one of the plurality of namespaces NS1, NS2, ..., NSK). In other words, in the example of FIG. 6A, a subject or party that accesses each namespace and performs a data migration operation based on the method according to example embodiments may be one of the plurality of applications APP1, APP2, ..., APPK.

In some example embodiments, only one namespace may be accessed by one application. In other example embodiments, two or more namespaces may be accessed simultaneously by two or more applications.

Figure 6B:
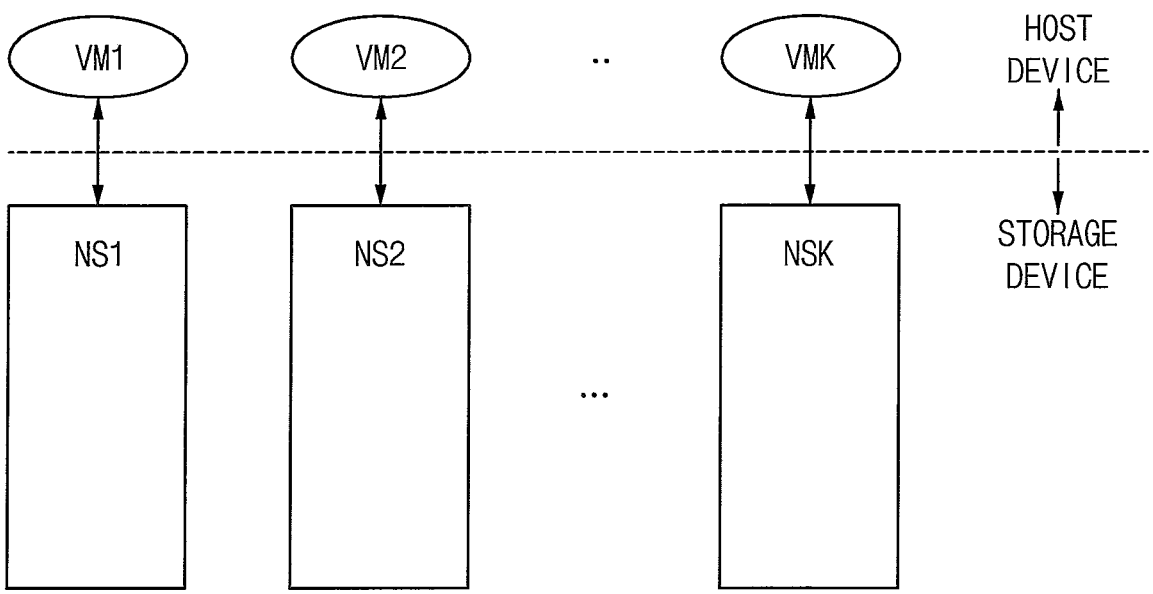

Referring to FIG. 6B, another example or allocating or assigning a plurality of namespaces NS1, NS2, ..., NSK is illustrated. The repetitive descriptions in view of FIG. 6A will be omitted.

For example, each of a plurality of virtual machines VM1, VM2, ..., VM may be allocated to a respective one of the plurality of namespaces NS1, NS2, ..., NSK depending on the types and characteristics of the plurality of virtual machines VM1, VM2, ..., VM that are executed or run on the host device. For example, the namespace NS1 may be allocated to the virtual machine VM1, the namespace NS2 may be allocated to the virtual machine VM2, and the namespace NSK may be allocated to the virtual machine VMK.

In some example embodiments, the host device may support a virtualization function. For example, each of the plurality of virtual machines VM1, VM2, ..., VM may be a virtualization core or processor generated by a virtualization operation, and may drive an operating system (OS) or an application independently. For example, the virtualization function and the virtualization operation may be performed using a VMware, a Single-Root IO Virtualization (SR-IOV), or the like. For example, an OS driven by a virtual machine may be referred to as, for example, a guest OS. Each of the plurality of virtual machines VM1, VM2, ..., VM may generate tasks, jobs and/or requests for using or accessing a respective one of the plurality of namespaces NS1, NS2, ..., NSK (e.g., for performing data write/read/erase operations on a respective one of the plurality of namespaces NS1, NS2, ..., NSK). In other words, in the example of FIG. 6B, a subject or party that accesses each namespace and performs a data migration operation based on the method according to example embodiments may be one of the plurality of virtual machines VM1, VM2, ..., VM.

Hereinafter, example embodiments will be described in detail based on an example in which the data migration operation is performed by an application. However, example embodiments are not limited thereto, and the data migration operation may be performed by a virtual machine.

Figure 7A:
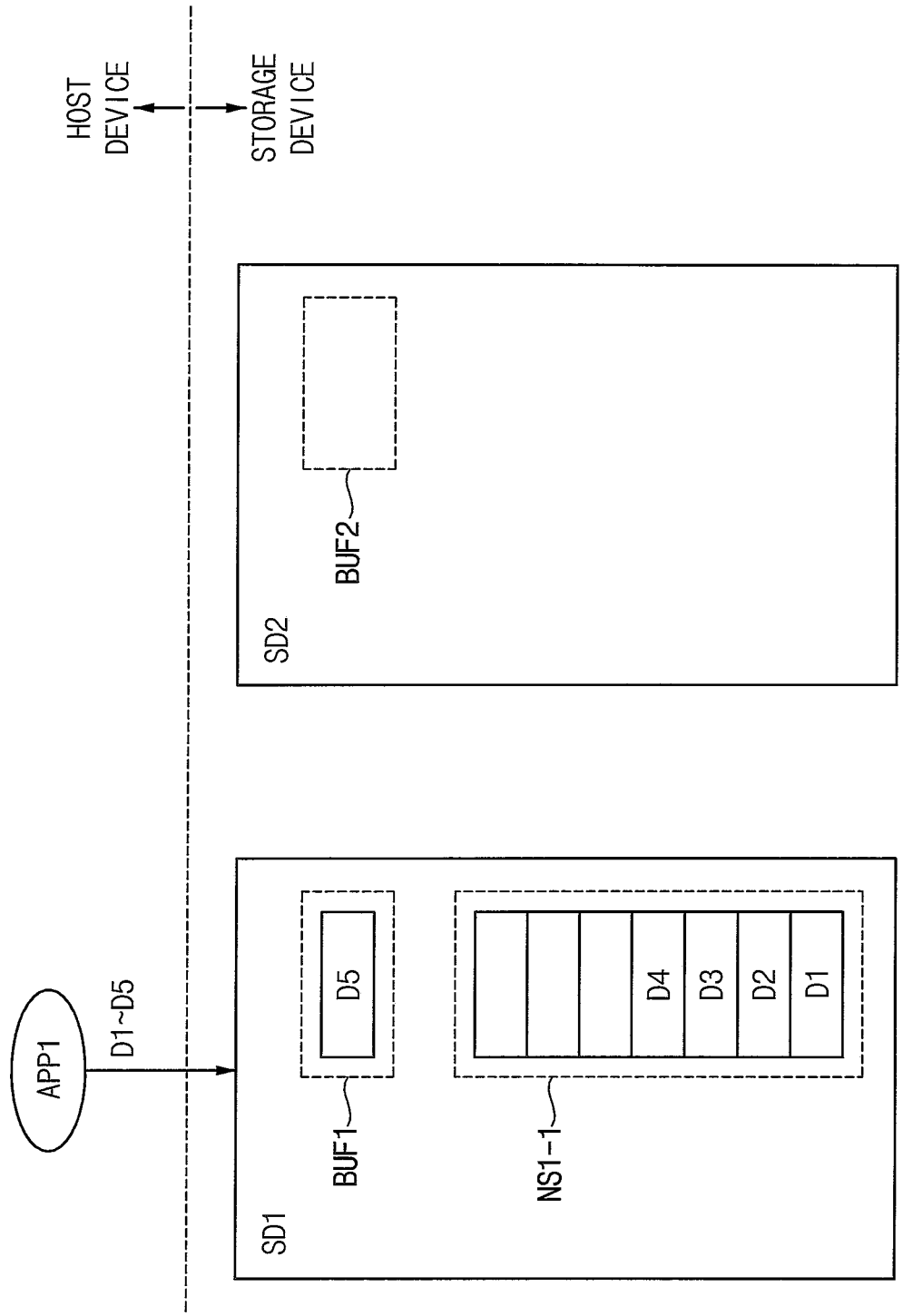
Figure 7B:
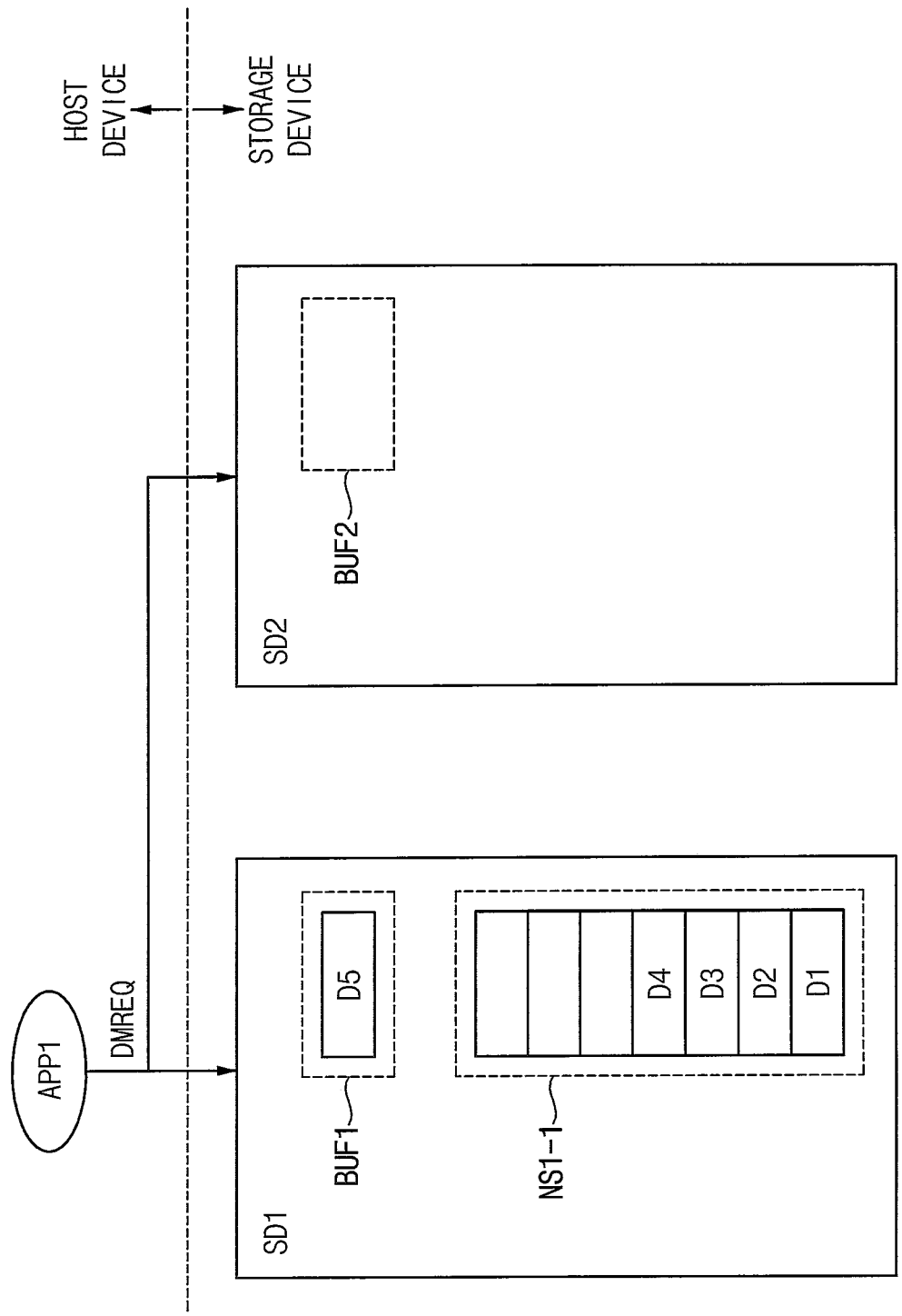

FIGS. 7A, 7B and 7C are diagrams for describing an example of receiving a data migration request and an example of generating a second namespace in FIG. 1.

Referring to FIGS. 1 and 7A, a namespace manager (e.g., the namespace manager 430 in FIG. 3) may generate and set a first namespace NS1-1 in a first storage device SD1. For example, the first namespace NS1-1 may be set on at least a portion of a plurality of first nonvolatile memories (e.g., the plurality of first nonvolatile memories 220a, 220b and 220c in FIG. 2) included in the first storage device SD1. The first storage device SD1 may also include a first buffer memory BUF1.

The namespace manager may allocate an application APP1 executed by a host device (e.g., the host device 100 in FIG. 2) to the first namespace NS1-1, and the application APP1 may access the first namespace NS1-1. For example, the application APP1 may perform a data write operation for storing a plurality of data D1, D2, D3, D4 and D5 into the first namespace NS1-1.

In some example embodiments, although not illustrated in FIG. 7A, the host device may further include a file system, a block layer and a device driver. The file system may manage files used by the host device. For example, the file system may manage file names, extensions, file attributes, file sizes, cluster information, etc. of files accessed by requests from the host device or applications executed by the host device. The block layer may be referred to as a block input/output layer, and may perform data read/write operations by units of a memory block. The device driver may control the first storage device SD1 at the operating system level. For example, the device driver may be a software module of a kernel for controlling the first storage device SD1. When the data write operation is to be performed, the application APP1 may generate a file storing request, the file system may generate a write request corresponding to the file storing request, the block layer may generate an input/output request corresponding to the write request, and the device driver may transmit a command, an address and the plurality of data D1, D2, D3, D4 and D5 to be written to the first storage device SD1 based on the input/output request.

The data transmitted to the first storage device SD1 by the application APP1 may be sequentially stored in the first namespace NS1-1 through the first buffer memory BUF1. For example, when the plurality of data D1, D2, D3, D4 and D5 are sequentially transmitted in an order from the data D1 to the data D5, the data D1 may be temporarily stored in the first buffer memory BUF1 and then may be stored in the first namespace NS1-1. Subsequently, the data D2 may be temporarily stored in the first buffer memory BUF1 and then may be stored in the first namespace NS1-1. Subsequently, the data D3 may be temporarily stored in the first buffer memory BUF1 and then may be stored in the first namespace NS1-1. Subsequently, the data D4 may be temporarily stored in the first buffer memory BUF1 and then may be stored in the first namespace NS1-1. The data D5 may be temporarily stored in the first buffer memory BUF1 and may still be in the first buffer memory BUF1 in a state before being stored in or flushed to the first namespace NS1-1.

In the example of FIG. 7A, the data D1, D2, D3 and D4, which are already stored in, copied to, or committed to the first namespace NS1-1, among the plurality of data D1, D2, D3, D4 and D5, may represent cold data according to example embodiments. The data D5, which is currently stored in the first buffer memory BUF1 and to be flushed to the first namespace NS1-1, among the plurality of data D1, D2, D3, D4 and D5, may represent hot data according to example embodiments.

Referring to FIGS. 1 and 7B, in S100, the application APP1 executed by the host device may generate a data migration request DMREQ and may transmit the data migration request DMREQ to the first storage device SD1 and a second storage device SD2 while the application APP1 accesses the first storage device SD1 and the first namespace NS1-1 (e.g., in real time, online and/or during I/O execution). The first and second storage devices SD1 and SD2 may receive the data migration request DMREQ.

In some example embodiments, the data migration request DMREQ may be generated when a predetermined condition (or situation) is satisfied. For example, the data migration request DMREQ may be generated when it is required to backup the confidential data such as passwords, important documents, or the like; when it is required to backup the development OS such as source codes; and/or when the device failure is predictable.

Referring to FIGS. 1 and 7C, in S200, the namespace manager may generate and set a second namespace NS1-2 corresponding to the first namespace NS1-1 in the second storage device SD2. For example, the second namespace NS1-2 may be set on at least a portion of a plurality of second nonvolatile memories (e.g., the plurality of second nonvolatile memories 320a, 320b and 320c in FIG. 2) included in the second storage device SD2. The second storage device SD2 may also include a second buffer memory BUF2.

In some example embodiments, a capacity of the second namespace NS1-2 may be greater than or equal to a capacity of the first namespace NS1-1. The second namespace NS1-2 may be a storage space for replacing the first namespace NS1-1, and thus the second namespace NS1-2 may have the capacity the same as or greater than that of the first namespace NS1-1.

In some example embodiments, the first and second storage devices SD1 and SD2 may be different storage devices that are physically distinct or distinguished from each other.

Although not illustrated in FIGS. 7A, 7B and 7C, each of the first and second storage devices SD1 and SD2 may further include at least one namespace allocated to at least one application other than the application APP1.

Figure 8:
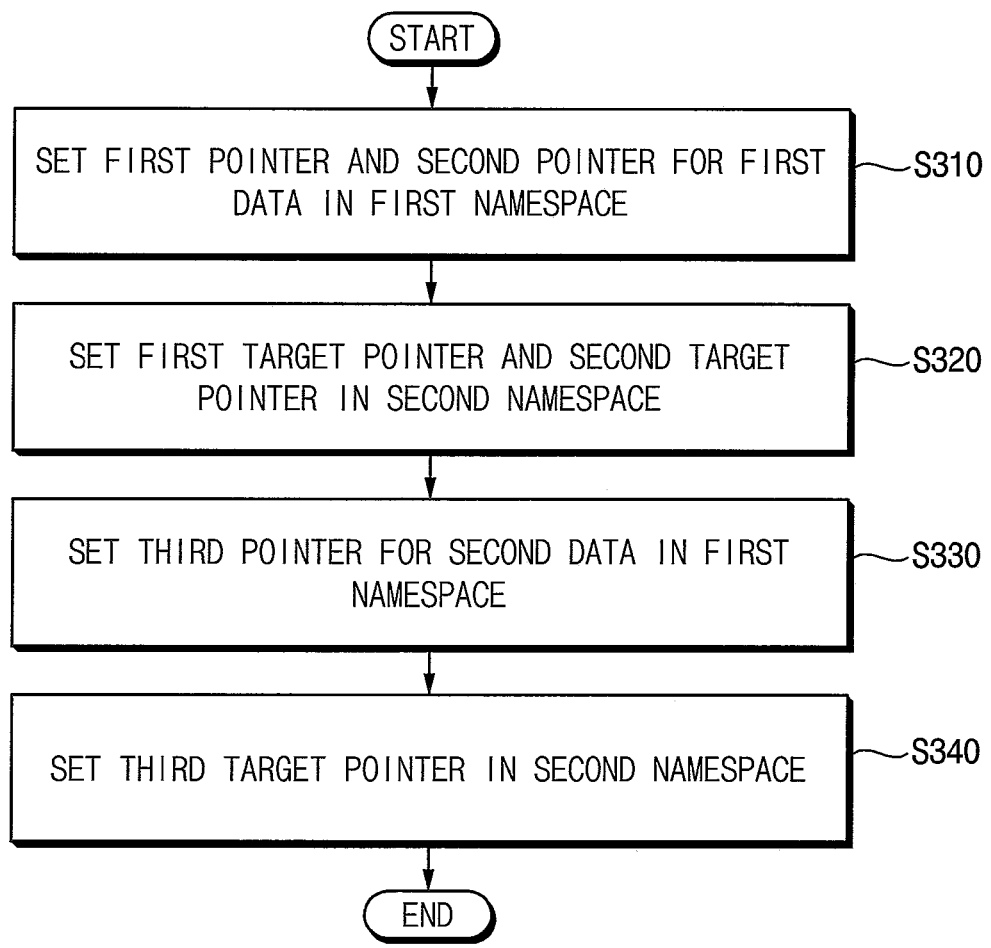
FIG. 8 is a flowchart illustrating an example of setting a pointer table in FIG. 1.
Figure 9A:
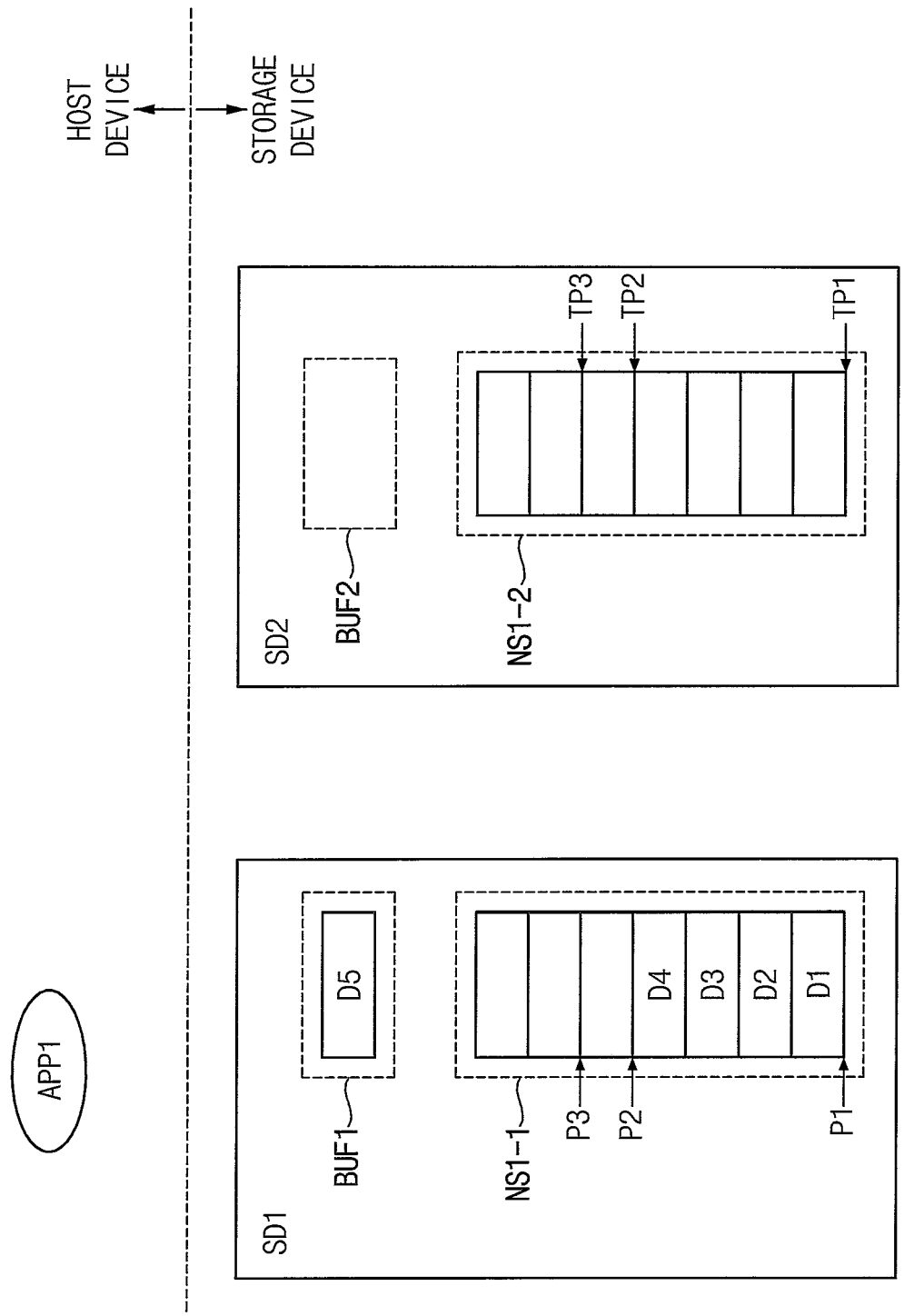

FIG. 8 is a flowchart illustrating an example of setting a pointer table in FIG. 1. FIGS. 9A and 9B are diagrams for describing an operation of setting a pointer table of FIG. 8.

Referring to FIGS. 1, 8, 9A and 9B, in S300, a first pointer and a second pointer may be set in the first namespace (S310), and a first target pointer and a second target pointer may be set in the second namespace (S320). The first pointer may indicate a start position of the first data in the first namespace, the second pointer may indicate an end (or last) position of the first data in the first namespace, the first target pointer may correspond to the first pointer, and the second target pointer may correspond to the second pointer. In addition, a third pointer may be set in the first namespace (S330), and a third target pointer may be set in the second namespace (S340). The third pointer may indicate an end position of the second data in the first namespace when the second data is flushed to the first namespace and when a start position of the second data in the first namespace is set to correspond to the second pointer, and the third target pointer may correspond to the third pointer.

For example, as illustrated in FIG. 9A, pointers P1 and P2 that respectively indicate start and end positions of the data D1, D2, D3 and D4 may be set in the first namespace NS1-1. The data D1, D2, D3 and D4 may be data already stored in the first namespace NS1-1 that is the original namespace. A pointer P3 that indicates an end position of the data D5 may be set in the first namespace NS1-1. The data D5 may be temporarily stored in the first buffer memory BUF1 currently, and the pointer P3 may indicate the end position of the data D5 when the data D5 is flushed to the first namespace NS1-1 to a position corresponding to the pointer P2 as a start position. Subsequently, target pointers TP1, TP2 and TP3 may be set in the second namespace NS1-2 that is the target namespace. The target pointers TP1, TP2 and TP3 in the second namespace NS1-2 may correspond to the pointers P1, P2 and P3 in the first namespace NS1-1, respectively. For example, sizes and ranges of storage spaces in the first namespace NS1-1 by the pointers P1, P2 and P3 may be substantially the same as sizes and ranges of storage spaces in the second namespace NS1-2 by the target pointers TP1, TP2 and TP3.

In some example embodiments, each of the pointers P1, P2 and P3 and the target pointers TP1, TP2 and TP3 may correspond to a logical address. For example, as illustrated in FIG. 9B, the pointers P1 and P2 may respectively indicate a first logical block address (LBA) LBA1-1 and a last LBA LBA1-2 of a location in which the data D1, D2, D3 and D4 are stored in the first namespace NS1-1, and the pointers P2 and P3 may respectively indicate a first LBA LBA1-2 and a last LBA LBA1-3 of a location in which the data D5 is to be stored in the first namespace NS1-1. Similarly, the target pointers TP1, TP2 and TP3 may respectively indicate LBAs LBA1-2, LBA2-2 and LBA3-2 of locations in which the data D1, D2, D3, D4 and D5 are to be stored in the second namespace NS1-2. The same number of the LBAs as the LBAs corresponding to the pointers P1, P2 and P3 may be allocated to the second namespace NS1-2 and the target pointers TP1, TP2 and TP3. For example, the pointer table of FIG. 9B may be stored in the buffer memories BUF1 and BUF2.

Figure 10:
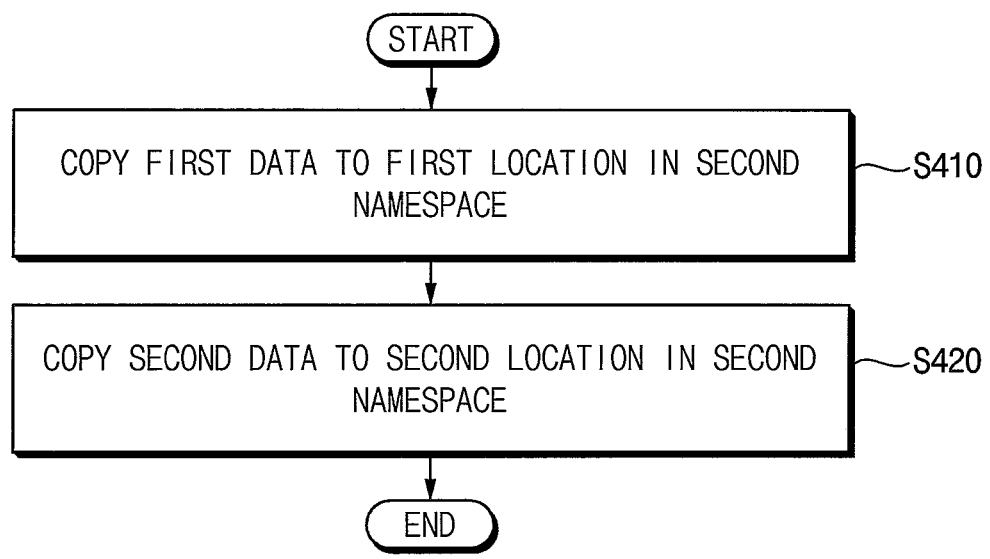
FIG. 10 is a flowchart illustrating an example of migrating first data and second data to a second namespace in FIG. 1.
Figure 11A:
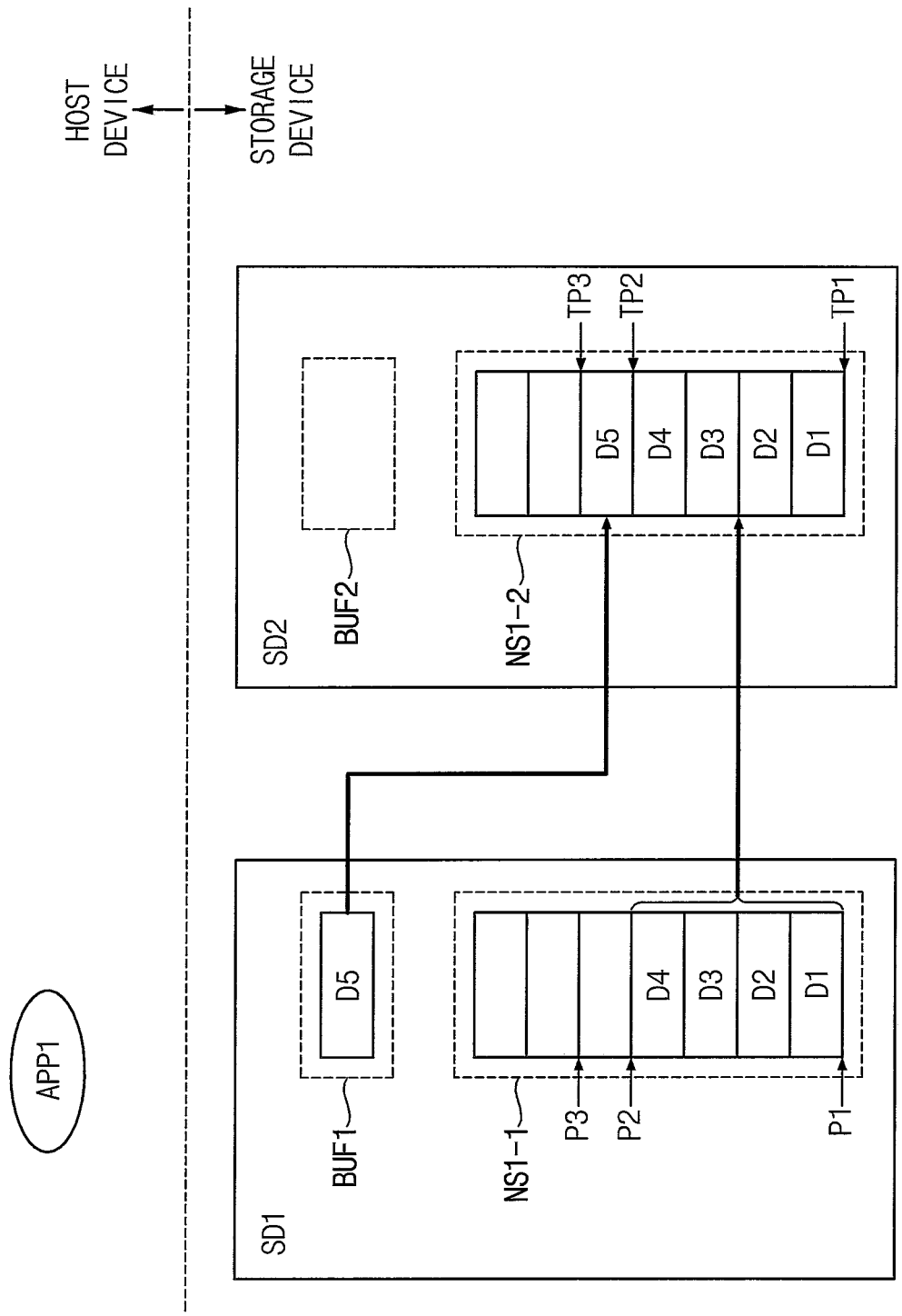
FIGS. 11A and 11B are diagrams for describing an operation of migrating first data and second data to a second namespace of FIG. 10.
Figure 11B:
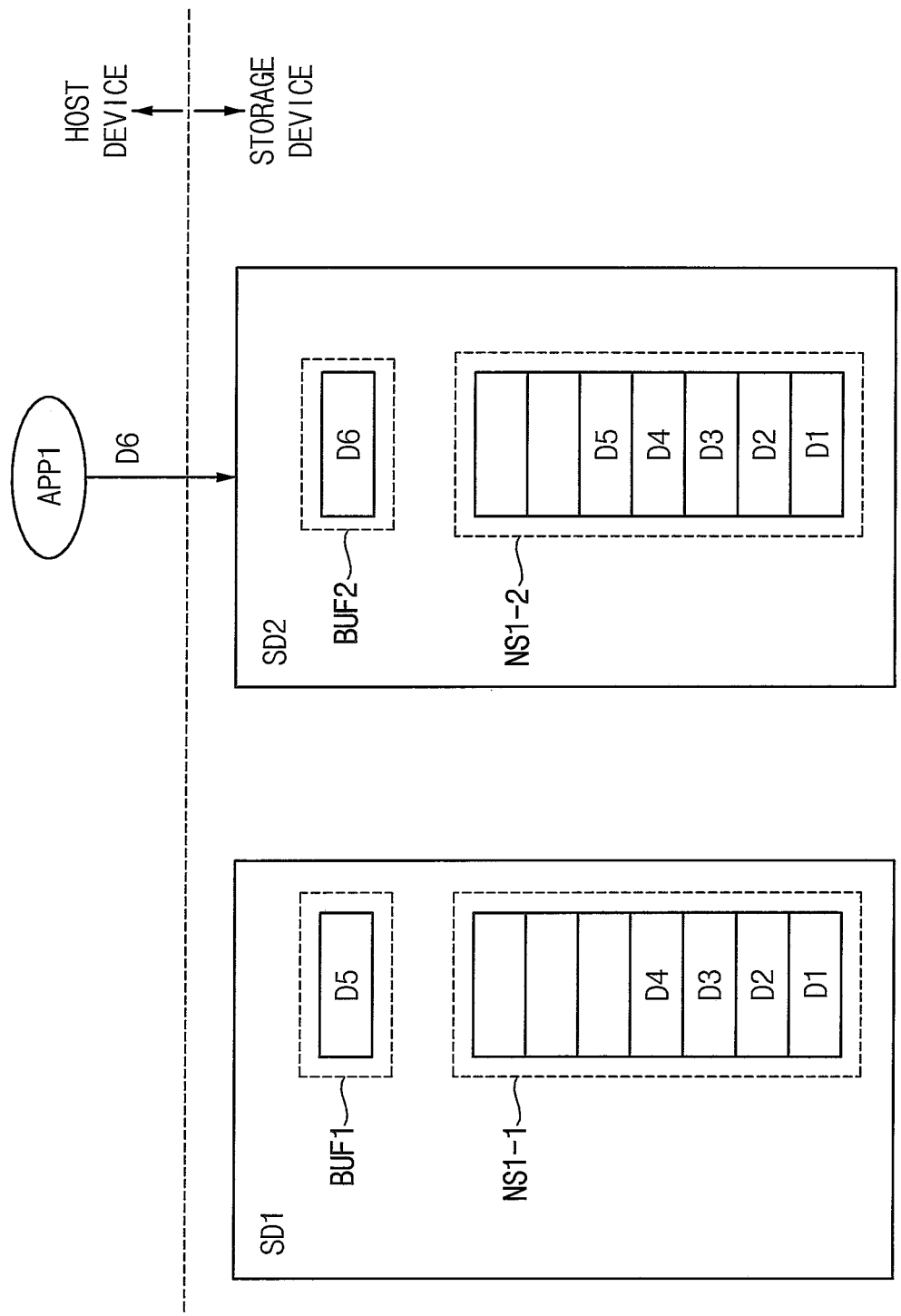

FIG. 10 is a flowchart illustrating an example of migrating first data and second data to a second namespace in FIG. 1. FIGS. 11A and 11B are diagrams for describing an operation of migrating first data and second data to a second namespace of FIG. 10.

Referring to FIGS. 1, 10 and 11A, in S400, the first data may be copied to a first location in the second namespace (S410), and the second data may be copied to a second location in the second namespace (S420). The first location may correspond to the first target pointer and the second target pointer, and the second location may correspond to the second target pointer and the third target pointer.

For example, as illustrated in FIG. 11A, the data D1, D2, D3 and D4 may be copied to a location corresponding to the target pointers TP1 and TP2 in the second namespace NS1-2, and the data D5 may be copied to a location corresponding to the target pointers TP2 and TP3 in the second namespace NS1-2. The data D5 may not be flushed to the first namespace NS1-1, and may be directly transmitted from the first buffer memory BUF1 to the second namespace NS1-2 without passing through the first namespace NS1-1.

Although not illustrated in FIG. 11A, the data D1, D2, D3, D4, and D5 may be transmitted from the first storage device SD1 to the second storage device SD2 through the host device, as will be described later with reference to FIG. 12.

In some example embodiments, as described above, the data migration operation may be performed in real time (or online) while the first storage device SD1 is accessed.

In some example embodiments, the data migration operation may be a background operation that is hidden for the host device. For example, the data migration operation may be performed in the background even when the first storage device SD1 is overloaded by an application other than the application APP1. Thus, the storage system may have the improved or enhanced performance.

Referring to FIG. 11B, after the data migration operation is completed, the application APP1 executed by the host device may access the second namespace NS1-2 included in the second storage device SD2. For example, the application APP1 may perform a data write operation for storing data D6 subsequent to the plurality of data D1, D2, D3, D4 and D5 into the second namespace NS1-2. For example, the data D1, D2, D3, D4 and D5 and the data D6 may be continuous or consecutive data. For example, the data D6 may be temporarily stored in the second buffer memory BUF2 and then may be stored in the second namespace NS1-2. FIG. 11B illustrates a state in which the data D6 is temporarily stored in the second buffer memory BUF2 and before being flushed to the second namespace NS1-2.

In some example embodiments, after the data migration operation is completed, the application APP1 may no longer access the first namespace NS1-1. For example, the plurality of data D1, D2, D3, D4 and D5 corresponding to the first namespace NS1-1 in the first storage device SD1 may be deleted and/or erased. For example, the first namespace NS1-1 may be allocated to another application or a setting for the first namespace NS1-1 may be released.

In other words, after the data migration operation is completed, the data D1, D2, D3, D4 and D5 between the target pointers TP1 and TP3 may be the entire data of the application APP1. In addition, the application APP1 and the first namespace NS1-1 may be separated, and the entire I/O of the application APP1 may be redirected to the second namespace NS1-2. Thus, the namespace migration may be entirely or totally performed during I/O while the data integrity is maintained.

Figure 12A:
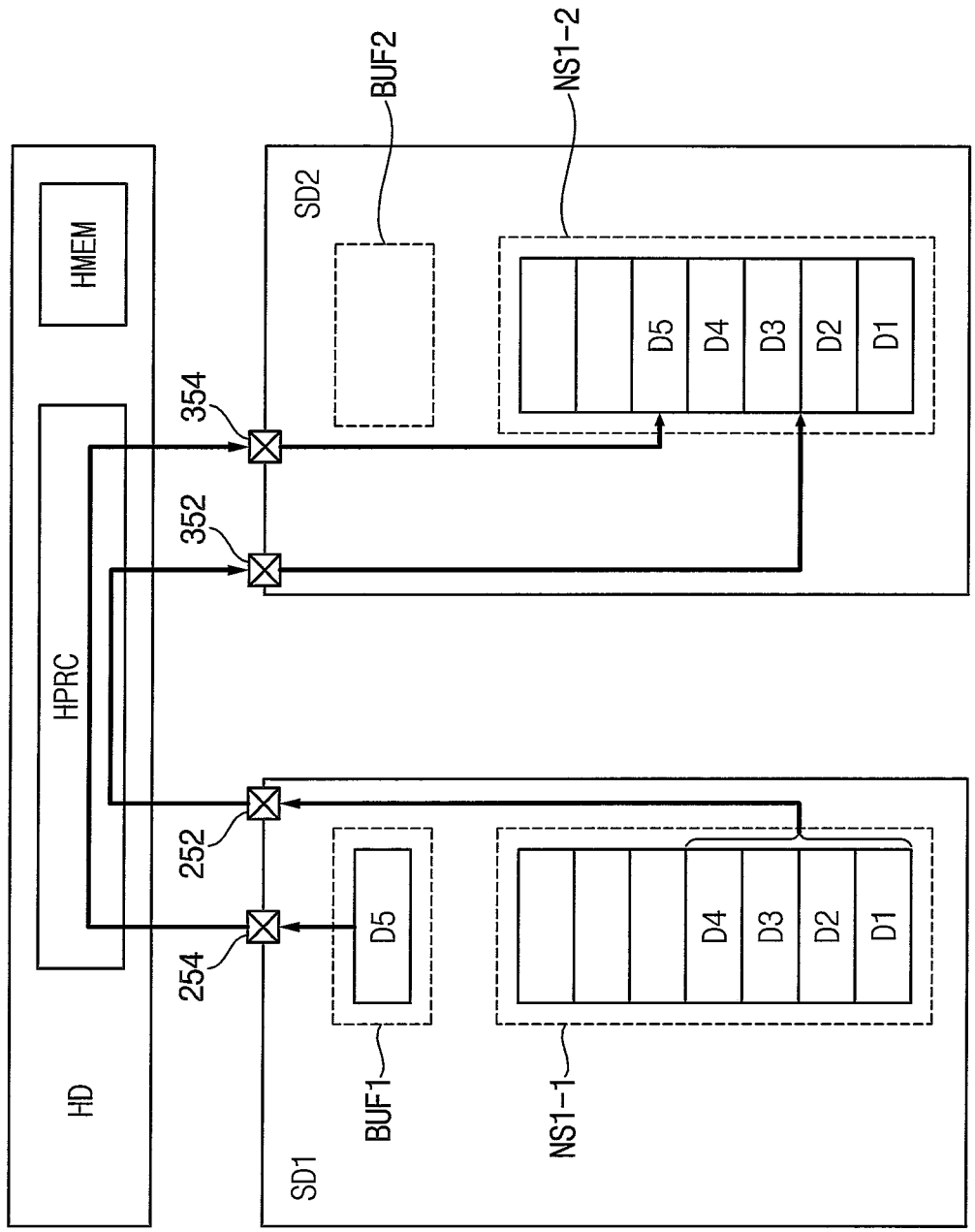

FIGS. 12A and 12B are diagrams for describing examples of migrating first data and second data to a second namespace of FIG. 10.

Referring to FIG. 12A, when the data migration operation is performed, the data D1, D2, D3 and D4 in the first namespace NS1-1 and the data D5 in the first buffer memory BUF1 may be substantially simultaneously or concurrently transmitted from the first storage device SD1 to the second storage device SD1.

For example, the first storage device SD1 may include a first pin 252 and a second pin 254. The first pin 252 may be connected to at least one first nonvolatile memory forming or included in the first namespace NS1-1. The second pin 254 may be connected to the first buffer memory BUF1. The data D1, D2, D3 and D4 may be transmitted via the first pin 252, the data D5 may be transmitted via the second pin 254, and the data D1, D2, D3, D4 and D5 may be substantially simultaneously transmitted. For example, a pin may be a contact pin or a contact pad, but example embodiments are not limited thereto.

Similarly, the second storage device SD2 may include a third pin 352 and a fourth pin 354. The third pin 352 may receive the data D1, D2, D3 and D4, and the fourth pin 354 may receive the data D5. In some example embodiments, the data D1, D2, D3, D4 and D5 may be stored in the second namespace NS1-2 through the second buffer memory BUF2.

In some example embodiments, a path between the first pin 252 and the third pin 352 may form or included in one channel, and a path between the second pin 254 and the fourth pin 354 may form or included in another channel. In the example of FIG. 12A, the data D1, D2, D3 and D4 in the first namespace NS1-1 and the data D5 in the first buffer memory BUF1 may be substantially simultaneously transmitted using two different channels.

In some example embodiments, the data D1, D2, D3, D4 and D5 may be directly transmitted to the second namespace NS1-2 only through a host processor HPRC included in a host device HD without passing through a host memory HMEM included in the host device HD. For example, a data transmission operation may be performed without passing through the host memory HMEM when using a controller memory buffer (CMB).

Referring to FIG. 12B, when the data migration operation is performed, the data D1, D2, D3 and D4 in the first namespace NS1-1 and the data D5 in the first buffer memory BUF1 may be sequentially transmitted from the first storage device SD1 to the second storage device SD2.

For example, the first storage device SD1 may include a first pin 256. The first pin 256 may be connected to at least one first nonvolatile memory forming or included in the first namespace NS1-1 and the first buffer memory BUF1. The data D1, D2, D3, D4 and D5 may be sequentially transmitted via the first pin 256. For example, the data D1, D2, D3 and D4 may be transmitted first, and then the data D5 may be transmitted later.

Similarly, the second storage device SD2 may include a second pin 356. The third pin 352 may sequentially receive the data D1, D2, D3, D4 and D5.

In some example embodiments, a path between the first pin 256 and the second pin 356 may form one channel. In the example of FIG. 12B, the data D1, D2, D3 and D4 in the first namespace NS1-1 and the data D5 in the first buffer memory BUF1 may be sequentially transmitted using one channel. For example, a flag and/or an identifier for distinguishing between the data D1, D2, D3 and D4 and the data D5 may be used.

In some example embodiments, the data D1, D2, D3, D4 and D5 may be directly transmitted to the second namespace NS1-2 only through the host processor HPRC included in the host device HD without passing through the host memory HMEM included in the host device HD.

Figure 13:
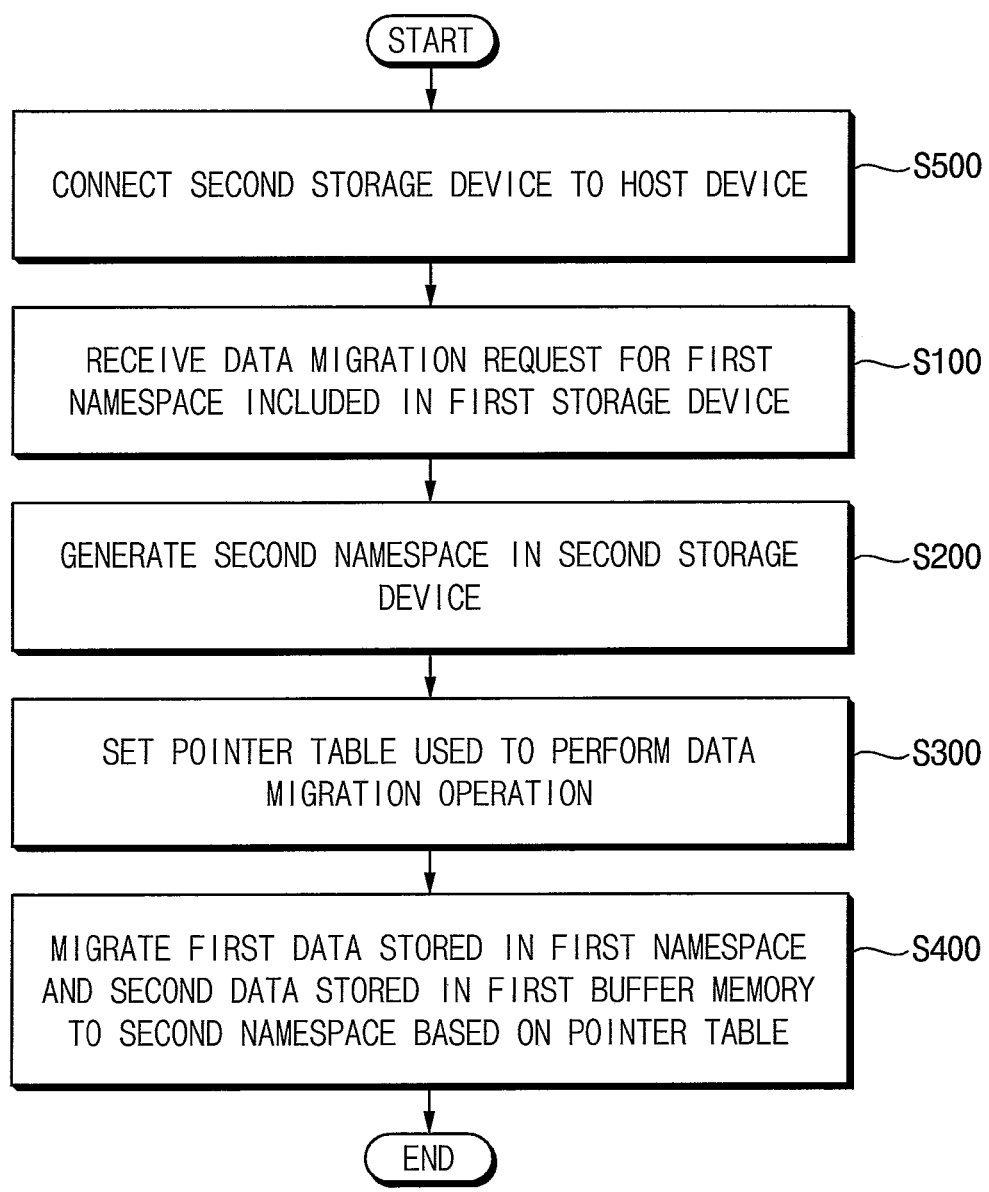
FIG. 13 is a flowchart illustrating a method of operating storage devices according to example embodiments.

FIG. 13 is a flowchart illustrating a method of operating storage devices according to example embodiments. The repetitive descriptions in view of FIG. 1 will be omitted.

Referring to FIG. 13, in a method of operating storage devices according to example embodiments, the second storage device may be electrically connected to the host device (S500). For example, the second storage device may not be connected to the host device in an initial operation time, and the second storage device may be inserted into the host device when the data migration operation is to be performed.

After S500 is performed, operations S100, S200, S300 and S400 may be sequentially performed. In other words, the operations of receiving the data migration request, generating the second namespace, setting the pointer table, and migrating the first data and the second data to the second namespace may be performed after the second storage device is connected to the host device. For example, an asynchronous event notification (AEN) may be transmitted to the host device (e.g., to a specific application and/or virtual machine) to start the data migration operation, and them operations S100, S200, S300 and S400 may be performed. Operations S100, S200, S300 and S400 may be substantially the same as operations S100, S200, S300 and S400 in FIG. 1, respectively.

Figure 14:
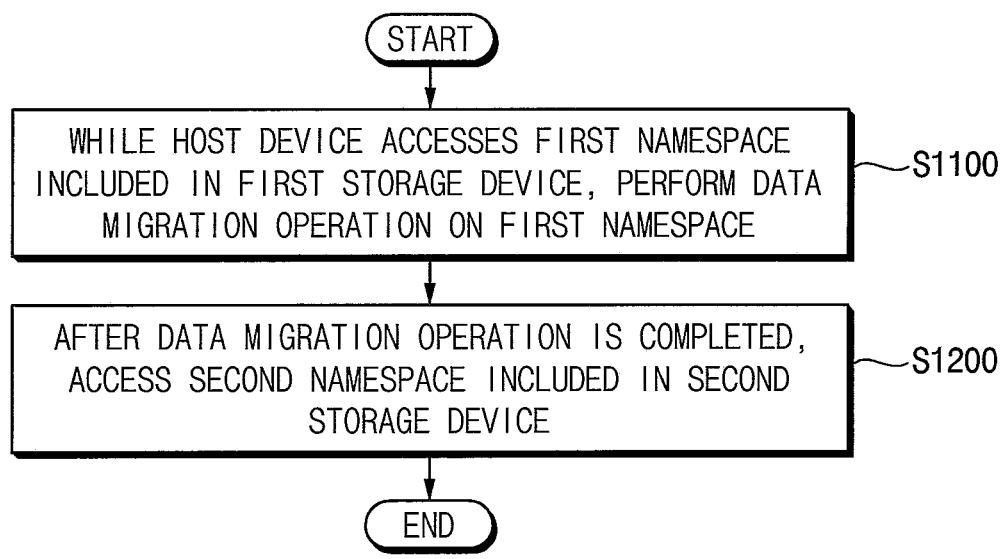
FIG. 14 is a flowchart illustrating a method of operating a storage system according to example embodiments.

FIG. 14 is a flowchart illustrating a method of operating a storage system according to example embodiments.

Referring to FIG. 14, a method of operating a storage system according to example embodiments is performed by a storage system that includes a host device, a first storage device and a second storage device. The first storage device and the second storage device are connected to each other via the host device. For example, the storage system may be implemented as described with reference to FIG. 2.

In the method of operating the storage system according to example embodiments, while the host device accesses a first namespace included in the first storage device, a data migration operation is performed on the first namespace (S1100). Operation S1100 may be performed based on the method of operating the storage devices according to example embodiments described with reference to FIGS. 1 through 13.

After the data migration operation is completed, the host device accesses a second namespace included in the second storage device (S1200). For example, S1200 may be performed as described with reference to FIG. 11B.

As will be appreciated by those skilled in the art, the inventive concept may be provided as a system, a method, a computer program product, and/or one or more computer readable medium(s) having computer readable program code stored thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 15:
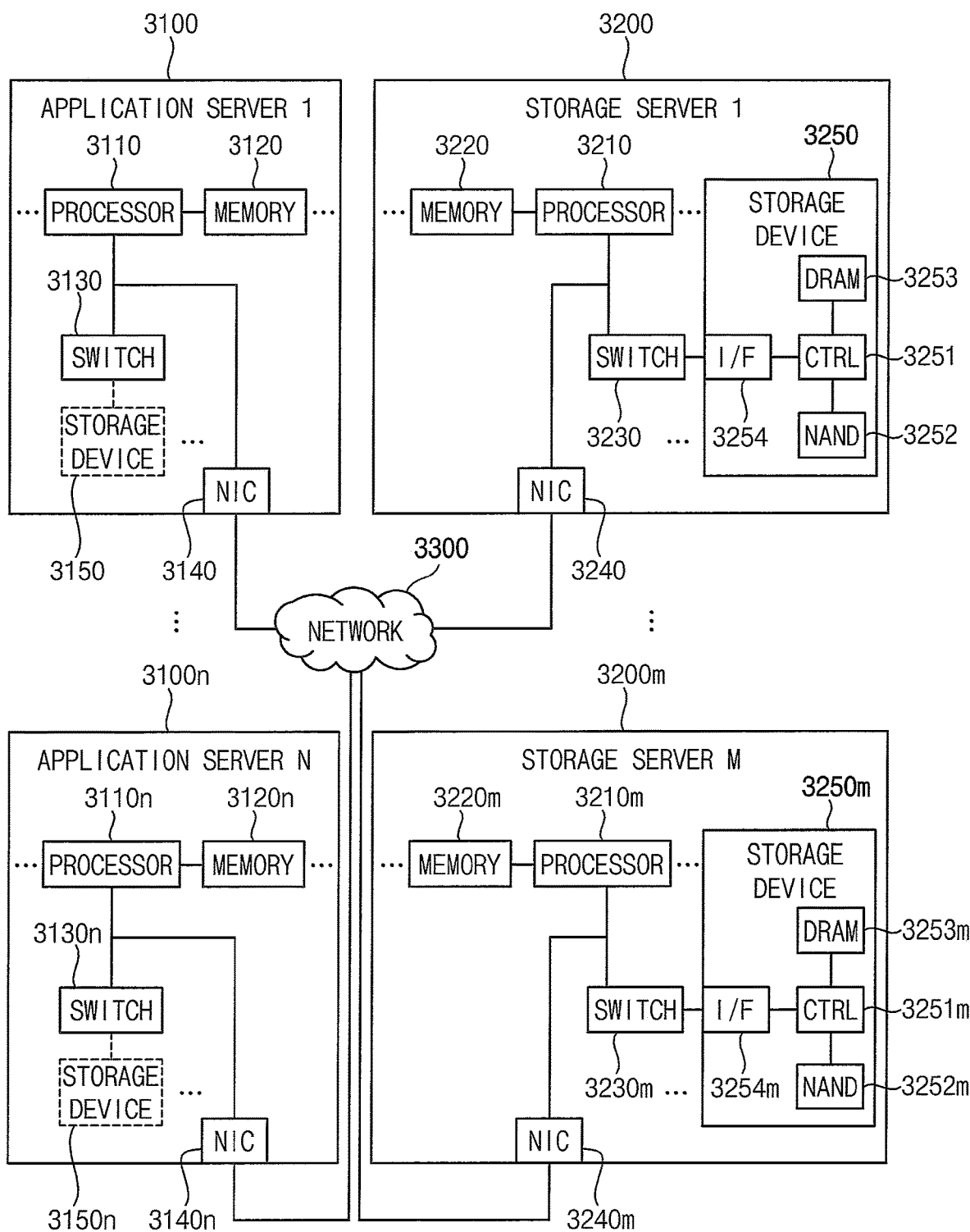
FIG. 15 is a block diagram illustrating a data center including a storage system according to example embodiments.

FIG. 15 is a block diagram illustrating a data center including a storage system according to example embodiments.

Referring to FIG. 15, a data center 3000 may be a facility that collects various types of data and provides various services, and may be referred to as a data storage center. The data center 3000 may be a system for operating search engines and databases, and may be a computing system used by companies such as banks or government agencies. The data center 3000 may include application servers 3100 to 3100$n$ and storage servers 3200 to 3200$m$. The number of the application servers 3100 to 3100$n$ and the number of the storage servers 3200 to 3200$m$ may be variously determined according to example embodiments, and the number of the application servers 3100 to 3100$n$ and the number of the storage servers 3200 to 3200$m$ may be different from each other.

The application server 3100 may include at least one processor 3110 and at least one memory 3120, and the storage server 3200 may include at least one processor 3210 and at least one memory 3220. An operation of the storage server 3200 will be described as an example. The processor 3210 may control overall operations of the storage server 3200, and may access the memory 3220 to execute instructions and/or data loaded in the memory 3220. The memory 3220 may include at least one of a double data rate (DDR) synchronous dynamic random access memory (SDRAM), a high bandwidth memory (HBM), a hybrid memory cube (HMC), a dual in-line memory module (DIMM), an Optane DIMM, a nonvolatile DIMM (NVDIMM), etc. The number of the processors 3210 and the number of the memories 3220 included in the storage server 3200 may be variously selected according to example embodiments. In some example embodiments, the processor 3210 and the memory 3220 may provide a processor-memory pair. In some example embodiments, the number of the processors 3210 and the number of the memories 3220 may be different from each other. The processor 3210 may include a single core processor or a multiple core processor. The above description of the storage server 3200 may be similarly applied to the application server 3100. The application server 3100 may include at least one storage device 3150, and the storage server 3200 may include at least one storage device 3250. In some example embodiments, the application server 3100 may not include the storage device 3150. The number of the storage devices 3250 included in the storage server 3200 may be variously selected according to example embodiments.

The application servers 3100 to 3100$n$ and the storage servers 3200 to 3200$m$ may communicate with each other through a network 3300. The network 3300 may be implemented using a fiber channel (FC) or an Ethernet. The FC may be a medium used for a relatively high speed data transmission, and an optical switch that provides high performance and/or high availability may be used. The storage servers 3200 to 3200m may be provided as file storages, block storages or object storages according to an access scheme of the network 3300.

In some example embodiments, the network 3300 may be a storage-only network or a network dedicated to a storage such as a storage area network (SAN). For example, the SAN may be an FC-SAN that uses an FC network and is implemented according to an FC protocol (FCP). For another example, the SAN may be an IP-SAN that uses a transmission control protocol/internet protocol (TCP/IP) network and is implemented according to an iSCSI (a SCSI over TCP/IP or an Internet SCSI) protocol. In other example embodiments, the network 3300 may be a general or normal network such as the TCP/IP network. For example, the network 3300 may be implemented according to at least one of protocols such as an FC over Ethernet (FCoE), a network attached storage (NAS), a nonvolatile memory express (NVMe) over Fabrics (NVMe-oF), etc.

Hereinafter, example embodiments will be described based on the application server 3100 and the storage server 3200. The description of the application server 3100 may be applied to the other application server 3100n, and the description of the storage server 3200 may be applied to the other storage server 3200m.

The application server 3100 may store data requested to be stored by a user or a client into one of the storage servers 3200 to 3200m through the network 3300. In addition, the application server 3100 may obtain data requested to be read by the user or the client from one of the storage servers 3200 to 3200m through the network 3300. For example, the application server 3100 may be implemented as a web server or a database management system (DBMS).

The application server 3100 may access a memory 3120n or a storage device 3150n included in the other application server 3100n through the network 3300, and/or may access the memories 3220 to 3220m or the storage devices 3250 to 3250m included in the storage servers 3200 to 3200m through the network 3300. Thus, the application server 3100 may perform various operations on data stored in the application servers 3100 to 3100n and/or the storage servers 3200 to 3200m. For example, the application server 3100 may execute a command for moving or copying data between the application servers 3100 to 3100n and/or the storage servers 3200 to 3200m. The data may be transferred from the storage devices 3250 to 3250m of the storage servers 3200 to 3200m to the memories 3120 to 3120n of the application servers 3100 to 3100n directly or through the memories 3220 to 3220m of the storage servers 3200 to 3200m. For example, the data transferred through the network 3300 may be encrypted data for security or privacy.

In the storage server 3200, an interface 3254 may provide a physical connection between the processor 3210 and a controller 3251 and/or a physical connection between a network interface card (NIC) 3240 and the controller 3251. For example, the interface 3254 may be implemented based on a direct attached storage (DAS) scheme in which the storage device 3250 is directly connected with a dedicated cable. For example, the interface 3254 may be implemented based on at least one of various interface schemes such as an advanced technology attachment (ATA), a serial ATA (SATA) an external SATA (e-SATA), a small computer system interface (SCSI), a serial attached SCSI (SAS), a peripheral component interconnection (PCI), a PCI express (PCIe), an NVMe, an IEEE 1394, a universal serial bus (USB), a secure digital (SD) card interface, a multi-media card (MMC) interface, an embedded MMC (eMMC) interface, a universal flash storage (UFS) interface, an embedded UFS (eUFS) interface, a compact flash (CF) card interface, etc.

The storage server 3200 may further include a switch 3230 and the NIC 3240. The switch 3230 may selectively connect the processor 3210 with the storage device 3250 or may selectively connect the NIC 3240 with the storage device 3250 under a control of the processor 3210. Similarly, the application server 3100 may further include a switch 3130 and an NIC 3140.

In some example embodiments, the NIC 3240 may include a network interface card, a network adapter, or the like. The NIC 3240 may be connected to the network 3300 through a wired interface, a wireless interface, a Bluetooth interface, an optical interface, or the like. The NIC 3240 may further include an internal memory, a digital signal processor (DSP), a host bus interface, or the like, and may be connected to the processor 3210 and/or the switch 3230 through the host bus interface. The host bus interface may be implemented as one of the above-described examples of the interface 3254. In some example embodiments, the NIC 3240 may be integrated with at least one of the processor 3210, the switch 3230 and the storage device 3250.

In the storage servers 3200 to 3200m and/or the application servers 3100 to 3100n, the processor may transmit a command to the storage devices 3150 to 3150n and 3250 to 3250m or the memories 3120 to 3120n and 3220 to 3220m to program or read data. For example, the data may be error-corrected data by an error correction code (ECC) engine. For example, the data may be processed by a data bus inversion (DBI) or a data masking (DM), and may include a cyclic redundancy code (CRC) information. For example, the data may be encrypted data for security or privacy.

The storage devices 3150 to 3150m and 3250 to 3250m may transmit a control signal and command/address signals to NAND flash memory devices 3252 to 3252m in response to a read command received from the processor. When data is read from the NAND flash memory devices 3252 to 3252m, a read enable (RE) signal may be input as a data output control signal and may serve to output data to a DQ bus. A data strobe signal (DQS) may be generated using the RE signal. The command and address signals may be latched in a page buffer based on a rising edge or a falling edge of a write enable (WE) signal.

The controller 3251 may control overall operations of the storage device 3250. In some example embodiments, the controller 3251 may include a static random access memory (SRAM). The controller 3251 may write data into the NAND flash memory device 3252 in response to a write command, or may read data from the NAND flash memory device 3252 in response to a read command. For example, the write command and/or the read command may be provided from the processor 3210 in the storage server 3200, the processor 3210m in the other storage server 3200m, or the processors 3110 to 3110n in the application servers 3100 to 3100n. A DRAM 3253 may temporarily store (e.g., may buffer) data to be written to the NAND flash memory device 3252 or data read from the NAND flash memory device 3252. Further, the DRAM 3253 may store meta data. The meta data may be data generated by the controller 3251 to manage user data or the NAND flash memory device 3252.

The storage devices 3150 to 3150m and 3250 to 3250m may be implemented based on the storage device(s) and the method(s) according to example embodiments described with reference to FIGS. 1 through 14. For example, the storage devices 3150 to 3150*m* and 3250 to 3250*m* may perform the method (e.g., data migration method) according to example embodiments.

The inventive concept may be applied to various electronic devices and systems that include the storage devices and the storage systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

In the method of operating storage devices and the method of operating the storage system according to example embodiments, the first data stored in the first namespace and the second data stored in the first buffer memory may be migrated to the second namespace at a time (sequentially or simultaneously) when the data migration operation is performed. In addition, the second data may be directly transmitted from the first buffer memory to the second namespace without passing through the first namespace and/or without passing through the host memory included in the host device. Accordingly, the online and/or real time namespace data migration process may be efficiently implemented while the data integrity is maintained, and the time and space for data processing may be saved.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating storage devices including a first storage device and a second storage device that are connected to each other via a host device, the method comprising:

receiving a data migration request for a first namespace included in the first storage device;

generating, based on receiving the data migration request at the second storage device, a second namespace in the second storage device, the second namespace corresponding to the first namespace;

setting a pointer table that is used to perform a data migration operation corresponding to the data migration request; and migrating first data and second data to the second namespace based on the pointer table, the first data being stored in the first namespace, the second data being stored in a first buffer memory included in the first storage device and having not yet been flushed from the first buffer memory to the first namespace, and wherein, based on the data migration operation being performed, concurrently or sequentially with the first data being migrated to the second namespace, the second data is directly transmitted from the first buffer memory to the second namespace without passing through the first namespace.

2. The method of claim 1, wherein:

the first data is cold data that is already stored in the first namespace, and the second data is hot data that is to be flushed from the first buffer memory to the first namespace.

3. The method of claim 2, wherein, based on the data migration operation being performed, the second data is not flushed from the first buffer memory to the first namespace and is directly transmitted from the first buffer memory to the second namespace without passing through the first namespace.

4. The method of claim 1, wherein, in the migrating the first data and the second data, the first data and the second data are directly transmitted to the second namespace without passing through a host memory included in the host device.

5. The method of claim 1, wherein a capacity of the second namespace is greater than or equal to a capacity of the first namespace.

6. The method of claim 5, wherein:

the first storage device includes a plurality of first nonvolatile memories, and the first namespace is set on at least a part of the plurality of first nonvolatile memories, and the second storage device includes a plurality of second nonvolatile memories, and the second namespace is set on at least a part of the plurality of second nonvolatile memories.

7. The method of claim 1, wherein setting the pointer table includes:
   setting a first pointer and a second pointer in the first namespace, the first pointer indicating a start position of the first data in the first namespace, the second pointer indicating an end position of the first data in the first namespace;
   setting a first target pointer and a second target pointer in the second namespace, the first target pointer corresponding to the first pointer, the second target pointer corresponding to the second pointer;
   setting a third pointer in the first namespace, the third pointer indicating an end position of the second data in the first namespace, with respect to the second data that is to be flushed to the first namespace, a start position of the second data in the first namespace being set to corresponding to the second pointer; and
   setting a third target pointer in the second namespace, the third target pointer corresponding to the third pointer.

8. The method of claim 7, wherein each of the first pointer, the second pointer, the third pointer, the first target pointer, the second target pointer and the third target pointer corresponds to a logical address.

9. The method of claim 7, wherein the migrating the first data and the second data to the second namespace includes:
   copying the first data to a first location in the second namespace, the first location corresponding to the first target pointer and the second target pointer; and
   copying the second data to a second location in the second namespace, the second location corresponding to the second target pointer and the third target pointer.

10. The method of claim 1, further comprising:
   connecting the second storage device to the host device, wherein the receiving the data migration request is performed after the second storage device is connected to the host device.

11. The method of claim 1, wherein, in the migrating the first data and the second data, the first data and the second data are simultaneously transmitted from the first storage device to the second storage device.

12. The method of claim 11, wherein:
   the first storage device includes a first pin and a second pin,
   the first pin is connected to at least one first nonvolatile memory included in the first namespace, and the second pin is connected to the first buffer memory, and
   the first data is transmitted via the first pin, and the second data is transmitted via the second pin.

13. The method of claim 1, wherein, in the migrating the first data and the second data, the first data and the second data are sequentially transmitted from the first storage device to the second storage device.

14. The method of claim 13, wherein:
   the first storage device includes a first pin,
   the first pin is connected to at least one first nonvolatile memory included in the first namespace and is connected to the first buffer memory, and
   the first data and the second data are sequentially transmitted via the first pin.

15. The method of claim 1, wherein the data migration operation is performed in real time while the first storage device is accessed.

16. The method of claim 1, wherein the data migration operation is a background operation that is hidden for the host device.

17. A method of operating a storage system including a host device, a first storage device and a second storage device, the first storage device and the second storage device being connected to each other via the host device, the method comprising:
   while the host device accesses a first namespace included in the first storage device, performing a data migration operation on the first namespace; and
   after the data migration operation is completed, accessing, by the host device, a second namespace included in the second storage device,
   wherein the performing the data migration operation includes:
   generating a data migration request for the first namespace;
   generating, based on receiving the data migration request at the second storage device, the second namespace in the second storage device, the second namespace corresponding to the first namespace;
   setting a pointer table that is used to perform the data migration operation; and
   migrating first data and second data to the second namespace based on the pointer table, the first data being stored in the first namespace, the second data being stored in a first buffer memory included in the first storage device and having not yet been flushed from the first buffer memory to the first namespace, and
   wherein, based on the data migration operation being performed, concurrently or sequentially with the first data being migrated to the second namespace, the second data is directly transmitted from the first buffer memory to the second namespace without passing through the first namespace.

18. The method of claim 17, wherein the first namespace and the second namespace are accessed by a first application among a plurality of applications that are executed by the host device.

19. The method of claim 17, wherein the first namespace and the second namespace are accessed by a first virtual machine among a plurality of virtual machines that are executed by the host device.

20. A method of operating storage devices including a first storage device and a second storage device that are connected to each other via a host device, the method comprising:
   while an application or a virtual machine executed by the host device accesses a first namespace included in the first storage device, receiving a data migration request for the first namespace from the host device;
   generating, based on receiving the data migration request at the second storage device, a second namespace in the second storage device based on the data migration request, the second namespace corresponding to the first namespace and having a capacity greater than or equal to that of the first namespace;
   setting a pointer table that is used to perform a data migration operation based on the data migration request; and
   migrating first data and second data to the second namespace based on the pointer table, the first data being stored in the first namespace, the second data being stored in a first buffer memory included in the first storage device and having not yet been flushed from the first buffer memory to the first namespace,
   wherein setting the pointer table includes:
   setting a first pointer, a second pointer and a third pointer in the first namespace, the first, second and third pointers indicating locations of the first data and the second data that are continuously stored in the first namespace; and setting a first target pointer, a second target pointer and a third target pointer in the second namespace, the first, second and third target pointers indicating locations of the first data and the second data that are continuously stored in the second namespace, wherein, based on the data migration operation being performed, the first data is copied to the second namespace such that the first data corresponds to the first target pointer and the second target pointer, and the second data is copied to the second namespace such that the second data corresponds to the second target pointer and the third target pointer, and wherein, based on the data migration operation being performed, concurrently or sequentially with the first data being migrated to the second namespace, the second data is not flushed from the first buffer memory to the first namespace and is directly transmitted from the first buffer memory to the second namespace without passing through the first namespace without passing through the first namespace.

* * * * *